(12) United States Patent
Sunkavalli et al.

(10) Patent No.: US 11,158,117 B2
(45) Date of Patent: Oct. 26, 2021

(54) ESTIMATING LIGHTING PARAMETERS FOR POSITIONS WITHIN AUGMENTED-REALITY SCENES

(71) Applicant: ADOBE INC., San Jose, CA (US)

(72) Inventors: Kalyan Sunkavalli, San Jose, CA (US); Sunil Hadap, Dublin, CA (US); Nathan Carr, San Jose, CA (US); Mathieu Garon, Quebec (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/877,227

(22) Filed: May 18, 2020

(65) Prior Publication Data

US 2020/0302684 A1 Sep. 24, 2020

Related U.S. Application Data

(63) Continuation of application No. 16/360,901, filed on Mar. 21, 2019, now Pat. No. 10,692,277.

(51) Int. Cl.
*G06T 15/00* (2011.01)
*G06T 15/50* (2011.01)
(Continued)

(52) U.S. Cl.
CPC ........ *G06T 15/506* (2013.01); *G06K 9/00671* (2013.01); *G06K 9/6232* (2013.01);
(Continued)

(58) Field of Classification Search
None
See application file for complete search history.

(56) References Cited

U.S. PATENT DOCUMENTS

2008/0221734 A1* 9/2008 Nagao ................. G06N 3/0454
 700/259
2014/0195468 A1* 7/2014 Mohammadi ........... G06N 3/02
 706/21
(Continued)

OTHER PUBLICATIONS

A. Bansal, B. Russell, and A. Gupta. Marr Revisited: 2D-3D model alignment via surface normal prediction. In CVPR, 2016.
(Continued)

*Primary Examiner* — Martin Mushambo
(74) *Attorney, Agent, or Firm* — Keller Jolley Preece

(57) ABSTRACT

This disclosure relates to methods, non-transitory computer readable media, and systems that use a local-lighting-estimation-neural network to estimate lighting parameters for specific positions within a digital scene for augmented reality. For example, based on a request to render a virtual object in a digital scene, a system uses a local-lighting-estimation-neural network to generate location-specific-lighting parameters for a designated position within the digital scene. In certain implementations, the system also renders a modified digital scene comprising the virtual object at the designated position according to the parameters. In some embodiments, the system generates such location-specific-lighting parameters to spatially vary and adapt lighting conditions for different positions within a digital scene. As requests to render a virtual object come in real (or near real) time, the system can quickly generate different location-specific-lighting parameters that accurately reflect lighting conditions at different positions within a digital scene in response to render requests.

20 Claims, 16 Drawing Sheets

(51) Int. Cl.
  *G06K 9/62* (2006.01)
  *G06T 19/00* (2011.01)
  *G06K 9/00* (2006.01)

(52) U.S. Cl.
  CPC .......... *G06K 9/6256* (2013.01); *G06T 19/006* (2013.01); *G06T 2215/12* (2013.01)

(56) References Cited

U.S. PATENT DOCUMENTS

2018/0012411 A1* 1/2018 Richey .................. G06T 19/006
2019/0066369 A1* 2/2019 Peng ....................... G06T 15/20

OTHER PUBLICATIONS

D. Clevert, T. Unterthiner, and S. Hochreiter. Fast and accurate deep network learning by exponential linear units (elus). CoRR, abs/1511.07289, 2015.

M.-A. Gardner, K. Sunkavalli, E. Yumer, X. Shen, E. Gambaretto, C. Gagné, and J.-F. Lalonde. Learning to predict indoor illumination from a single image. arXiv preprint arXiv:1704.00090, 2017.

B. Hariharan, P. Arbelaez, R. Girshick, and J. Malik. Hypercolumns for object segmentation and fine-grained localization. In Proceedings of the IEEE conference on computer vision and pattern recognition, pp. 447-456, 2015.

K. He, X. Zhang, S. Ren, and J. Sun. Deep residual learning for image recognition. arXiv preprint arXiv:1512.03385, 2015.

G. Huang, Z. Liu, L. van der Maaten, and K. Q. Weinberger. Densely connected convolutional networks. In Proceedings of the IEEE Conference on Computer Vision and Pattern Recognition, 2017.

F. N. Iandola, M. W. Moskewicz, K. Ashraf, S. Han, W. J. Daily, and K. Keutzer. Squeezenet: Alexnet-level accuracy with 50x fewer parameters and <1mb model size. CoRR, abs/1602.07360, 2016.

W. Jakob. Mitsuba renderer, 2010. http://www.mitsuba-renderer.org.

D. Mahajan, R. Ramamoorthi, and B. Curless. A theory of spherical harmonic identities for brdf/lighting transfer and image consistency. In European Conference on Computer Vision, pp. 41-55. Springer, 2006.

R. Ramamoorthi and P. Hanrahan. An efficient representation for irradiance environment maps. In Proceedings of the 28th annual conference on Computer graphics and interactive techniques, pp. 497-500. ACM, 2001.

O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet Large Scale Visual Recognition Challenge. International Journal of Computer Vision (IJCV), 115(3):211-252, 2015.

S. Song, F. Yu, A. Zeng, A. X. Chang, M. Savva, and T. Funkhouser. Semantic scene completion from a single depth image. IEEE Conference on Computer Vision and Pattern Recognition, 2017.

Y. Zhang, S. Song, E. Yumer, M. Savva, J.-Y. Lee, H. Jin, and T. Funkhouser. Physically-based rendering for indoor scene understanding using convolutional neural networks. The IEEE Conference on Computer Vision and Pattern Recognition (CVPR), 2017.

U.S. Appl. No. 16/360,901, Feb. 26, 2020, Notice of Allowance.

Aijia, Zhang et al.; "Illumination estimation for augmented reality based on a global illumination model", Multimedia Tools and Applications, Sep. 13, 2019, vol. 78, Nr 23, pp. 33487-33503, doi:10.1007/s11042-019-08155-2 see especially p. 33489.

Jinwoo, Park et al.; "Physically-inspired Deep Light Estimation from a Homogeneous-Material Object for Mixed Reality Lighting", Park Hunmin; Yoon Sung-Eui; Woo Woontack, IEEE Transactions on Visualization and Computer Graphics, Feb. 12, 2020, vol. 26, Nr 5, pp. 2002-2011, doi:10.1109/TVCG.2020.2973050 see especially p. 2003.

LeGendre, Chloe et al.; "DeepLight: Learning Illumination for Unconstrained Mobile Mixed Reality", 2019 IEEE/CVF Conference on Computer Vision and Pattern Recognition (CVPR), pp. 5911-5921, https://ieeexplore.ieee.org/document/8954141, see especially section 3.1 and 3.2.

Combined Search and Examination as received in UK application GB1917995.1 dated May 27, 2020.

Intention to Grant as received in UK application GB1917995.1 dated Jun. 22, 2021.

Examination Report as received in Australian application 2019279917 dated Sep. 2, 2021.

\* cited by examiner

ESTIMATING LIGHTING PARAMETERS FOR POSITIONS WITHIN AUGMENTED-REALITY SCENES

CROSS-REFERENCE TO RELATED APPLICATIONS

The present application is a continuation of U.S. application Ser. No. 16/360,901, filed on Mar. 21, 2019. The aforementioned application is hereby incorporated by reference in its entirety.

BACKGROUND

Augmented-reality systems often portray digitally enhanced images or other scenes with computer-simulated objects. To portray such scenes, an augmented-reality system sometimes renders both real objects and computer-simulated objects with shading and other lighting conditions. Many augmented-reality systems attempt to seamlessly render virtual objects composited with objects from the real world. To achieve convincing composites, an augmented reality system must illuminate virtual objects with consistent lighting matching a physical scene. Because the real-world is constantly changing (e.g., objects move, lighting changes), augmented-reality systems that pre-capture lighting conditions often cannot adjust lighting conditions to reflect real-world changes.

Despite advances in estimating lighting conditions for digitally enhanced scenes, some technical limitations still impede conventional augmented-reality systems from realistically portraying lighting conditions on computing devices. Such limitations include altering lighting conditions when a digitally enhanced scene changes, quickly rendering or adjusting lighting conditions in real (or near-real) time, and faithfully capturing variation of lighting throughout a scene. These limitations are exasperated in three-dimensional scenes, where each location at a given moment can receive a different amount of light from a full 360-degree range of directions. Both the directional dependence and the variation of light across the scene play a critical role when attempting to faithfully and convincingly render synthetic objects into the scene.

For example, some conventional augmented-reality systems cannot realistically portray lighting conditions for a computer-simulated object in real (or near-real) time. In some cases, conventional augmented-reality systems use an ambient-light model (i.e., only a single constant term with no directional information) to estimate the light received by an object from its environment. For example, conventional augmented-reality systems often use simple heuristics to create lighting conditions, such as by relying on mean-brightness values for pixels of (or around) an object to create lighting conditions in an ambient-light model. Such an approximation does not capture the directional variation of lighting and can fail to produce a reasonable ambient-lighting approximation under many conditions-resulting in unrealistic and unnatural lighting. Such lighting makes computer-simulated objects appear unrealistic or out of place in a digitally enhanced scene. For instance, in some cases, conventional systems cannot accurately portray lighting on objects when light for a computer-simulated object comes from outside the perspective (or point of view of) shown in a digitally enhanced image.

In addition to challenges to portraying realistic lighting, in some cases, conventional augmented-reality systems cannot flexibly adjust or change lighting conditions for a particular computer-simulated object in a scene. For instance, some augmented-reality systems determine lighting conditions for a digitally enhanced image as a collective set of objects or as an image as a whole-instead of lighting conditions for particular objects or locations within the digitally enhanced image. Because such lighting conditions generally apply to a set of objects or an entire image, conventional systems either cannot adjust lighting conditions for a particular object or can only do so by redetermining lighting conditions for the entire digitally enhanced image in an inefficient use of computing resources.

Independent of technical limitations affecting the realism or flexibility of lighting in augmented reality, conventional augmented-reality systems sometimes cannot expeditiously estimate lighting conditions for objects within a digitally enhanced scene. For instance, some conventional augmented-reality systems receive user input defining baseline parameters, such as image geometry or material properties, and estimate parametric light for a digitally enhanced scene based on the baseline parameters. While some conventional systems can apply such user-defined parameters to accurately estimate lighting conditions, such systems can neither quickly estimate parametric lighting nor apply an image-geometry-specific lighting model to other scenes with differing light sources and geometry.

SUMMARY

This disclosure describes embodiments of methods, non-transitory computer readable media, and systems that solve the foregoing problems in addition to providing other benefits. For example, based on a request to render a virtual object in a digital scene, the disclosed systems use a local-lighting-estimation-neural network to generate location-specific-lighting parameters for a designated position within the digital scene. In certain implementations, the disclosed systems render a modified digital scene comprising the virtual object at the designated position illuminated according to the location-specific-lighting parameters. As explained below, the disclosed systems can generate such location-specific-lighting parameters to spatially vary lighting for different positions within a digital scene. Accordingly, as requests to render a virtual object come in real (or near real) time, the disclosed systems can quickly generate different location-specific-lighting parameters that accurately reflect lighting conditions at different positions of a digital scene based on such render requests.

For instance, in some embodiments, the disclosed systems identify a request to render a virtual object at a designated position within a digital scene. The disclosed systems extract a global feature map from the digital scene using a first set of network layers of a local-lighting-estimation-neural network. The systems further generate a local position indicator for the designated position and modify the global feature map for the digital scene based on the local position indicator. Based on the modified global feature map, the systems generate location-specific-lighting parameters for the designated position using a second set of layers of the local-lighting-estimation-neural network. In response to the request to render, the systems render a modified digital scene comprising the virtual object at the designated position illuminated according to the location-specific-lighting parameters.

The following description sets forth additional features and advantages of the disclosed methods, non-transitory computer readable media, and systems, and may make such additional features and advantages obvious or disclose them from the practice of exemplary embodiments.

BRIEF DESCRIPTION OF THE DRAWINGS

The detailed description refers to the drawings briefly described below.

DETAILED DESCRIPTION

Figure 1:
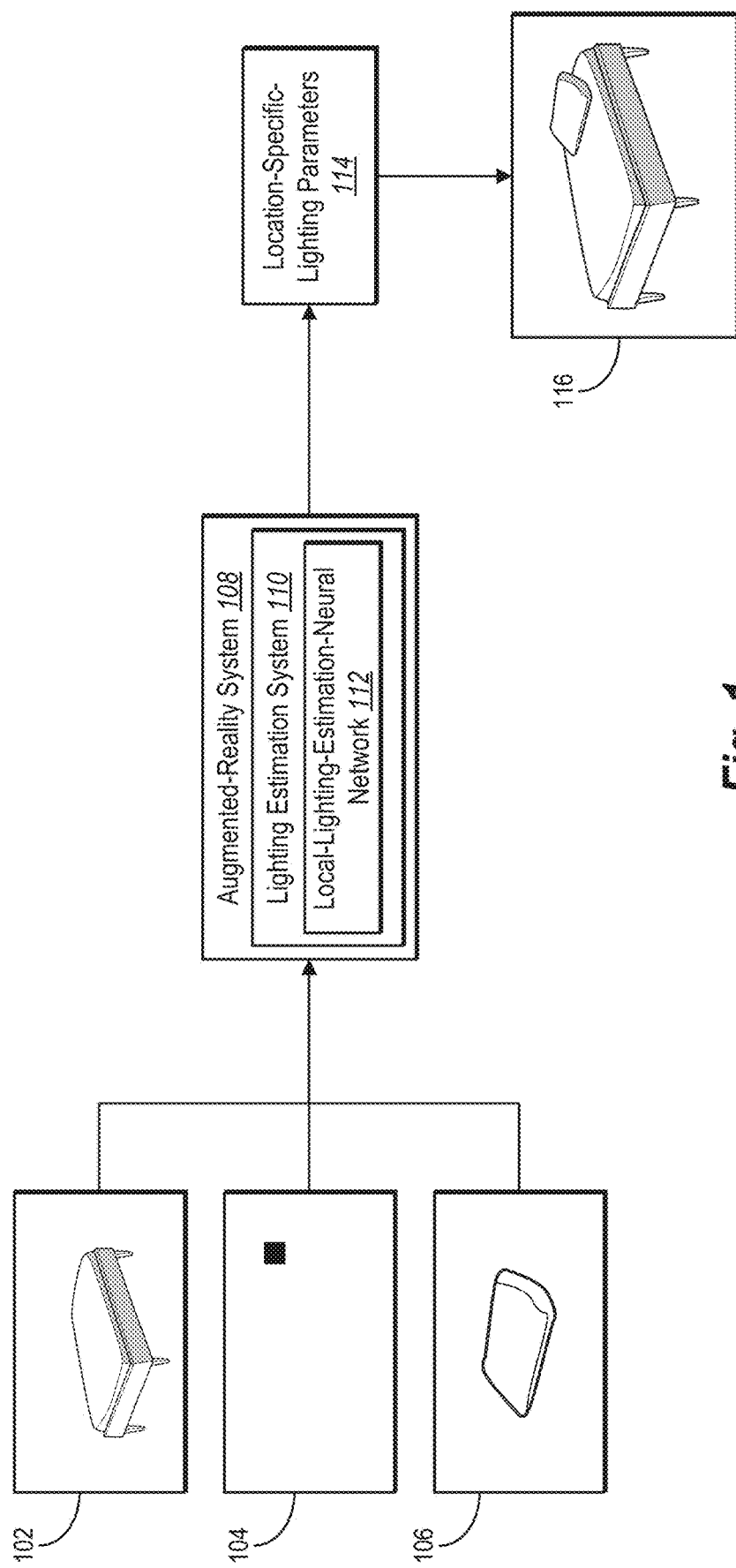
FIG. 1 illustrates an augmented-reality system and a lighting estimation system using a local-lighting-estimation-neural network to generate location-specific-lighting parameters for a designated position within a digital scene and rendering a modified digital scene comprising the virtual object at the designated position according to the parameters in accordance with one or more embodiments.

This disclosure describes one or more embodiments of a lighting estimation system that uses a local-lighting-estimation-neural network to estimate lighting parameters for specific positions within a digital scene for augmented reality. For example, based on a request to render a virtual object in a digital scene, the lighting estimation system uses a local-lighting-estimation-neural network to generate location-specific-lighting parameters for a designated position within the digital scene. In certain implementations, the lighting estimation system also renders a modified digital scene comprising the virtual object at the designated position according to the parameters. In some embodiments, the lighting estimation system generates such location-specific-lighting parameters to spatially vary and adapt lighting conditions for different positions within a digital scene. As requests to render a virtual object come in real (or near real) time, the lighting estimation system can quickly generate different location-specific-lighting parameters that accurately reflect lighting conditions at different positions within or from different perspectives for a digital scene in response to render requests. The lighting estimation system can likewise quickly generate different location-specific-light parameters that reflect a change in lighting or other conditions.

For instance, in some embodiments, the lighting estimation system identifies a request to render a virtual object at a designated position within a digital scene. To render such a scene, the lighting estimation system extracts a global feature map from the digital scene using a first set of network layers of a local-lighting-estimation-neural network. The lighting estimation system further generates a local position indicator for the designated position and modifies the global feature map for the digital scene based on the local position indicator. Based on the modified global feature map, the lighting estimation system generates location-specific-lighting parameters for the designated position using a second set of layers of the local-lighting-estimation-neural network. In response to the request to render, the lighting estimation system renders a modified digital scene comprising the virtual object at the designated position illuminated according to the location-specific-lighting parameters.

By using location-specific-lighting parameters, in some embodiments, the lighting estimation system can both illuminate a virtual object from different perspectives of a scene and quickly update lighting conditions for different positions, different perspectives, lighting changes, or other environment changes to a scene or a virtual object in a scene. For instance, in some cases, the lighting estimation system generates location-specific-lighting parameters that capture lighting conditions for a position of a virtual object from various perspectives within the digital scene. Upon identifying a position-adjustment request to move a virtual object to a new designated position, the lighting estimation system can also generate a new local position indicator for the new designated position and use a neural network to modify a global feature map for the digital scene to output new lighting parameters for the new designated position. Upon identifying, or otherwise in response to, a change in lighting conditions for a digital scene, the lighting estimation system can likewise update a global feature map for the digital scene to output new lighting parameters for the new lighting conditions. For example, as a viewers point of view changes (e.g., a camera moves through a scene), as lighting changes in a scene (e.g., lights are added, dimmed, oculuded, exposed), as objects within a scene or the scene itself changes, the lighting estimation system can dynamically determine or update lighting parameters.

To generate location-specific-lighting parameters, the lighting estimation system can use different types of local position indicators. For example, in certain embodiments, the lighting estimation system identifies (as the local position indicator) a local position coordinate representing a designated position within a digital scene. In some implementations, by contrast, the lighting estimation system identifies one or more local position indicators from features extracted by different layers of the local-lighting-estimation-neural network, such as pixels corresponding to a designated position from different feature maps extracted by neural-network layers.

When generating location-specific-lighting parameters, the lighting estimation system can generate spherical-harmonic coefficients that indicate lighting conditions for a designated position within a digital scene for a virtual object. Such location-specific-spherical-harmonic coefficients can capture high dynamic range ("HDR") lighting for a position within a digital scene when the digital scene is represented in low dynamic range ("LDR") lighting. As a virtual object changes positions within the digital scene, the lighting estimation system can use the local-lighting-estimation-neural network to generate new location-specific-spherical-harmonic coefficients by request to realistically depict changes in lighting at the changed positions of the virtual object.

As suggested above, in some embodiments, the lighting estimation system not only applies a local-lighting-estimation-neural network but can optionally train such a network to generate location-specific-lighting parameters. When training a neural network, in certain implementations, the lighting estimation system extracts a global-feature-training map from a digital training scene using a first set of layers of a local-lighting-estimation-neural network. The lighting estimation system further generates a local-position-training indicator for a designated position within the digital training scene and modifies the global-feature-training map based on the local-position-training indicator for the designated position.

From the modified global-feature-training map, the lighting estimation system generates location-specific-lighting-training parameters for the designated position using a second set of network layers of the local-lighting-estimation-neural network. The lighting estimation system subsequently modifies network parameters of the local-lighting-estimation-neural network based on a comparison of the location-specific-lighting-training parameters with ground-truth-lighting parameters for the designated position within the digital training scene. By iteratively generating such location-specific-lighting-training parameters and adjusting network parameters of the neural network, the lighting estimation system can train a local-lighting-estimation-neural network to a point of convergence.

As just noted, the lighting estimation system can use ground-truth-lighting parameters for designated positions to facilitate training. To create such ground-truth-lighting parameters, in some embodiments, the lighting estimation system generates a cube map for various positions within a digital training scene. The lighting estimation system subsequently projects cube maps for the digital training scene to ground-truth-spherical-harmonic coefficients. Such ground-truth-spherical-harmonic coefficients can be used for comparison when iteratively training the local-lighting-estimation-neural network.

As suggested above, the disclosed lighting estimation system overcomes several technical deficiencies that hinder conventional augmented-reality systems. For example, the lighting estimation system improves upon the accuracy and realism with which existing augmented-reality systems generate lighting conditions for specific locations within a digital scene. As noted above and described below, the lighting estimation system can create such realistic lighting in part by using a local-lighting-estimation-neural network trained to generate location-specific-spherical-lighting parameters based on a local position indicator for a designated position within a digital scene.

Unlike some conventional systems that use mean-brightness values resulting in unnatural lighting, the disclosed lighting estimation system can create lighting parameters with coordinate-level accuracy corresponding to the local position indicator. Further, unlike certain conventional systems that cannot portray lighting coming from outside the perspective of a digital scene, the disclosed lighting estimation system can create lighting parameters that capture lighting conditions emanating from a light source outside a digital scene's perspective. To attain such accuracy, in some embodiments, the lighting estimation system generates location-specific-spherical-harmonic coefficients that efficiently capture realistic and natural-looking lighting conditions for a particular position from multiple points of view within the digital scene.

In addition to more realistically portraying lighting, in some embodiments, the lighting estimation system demonstrates more flexibility in rendering different lighting conditions for different positions relative to existing augmented-reality systems. Unlike some conventional augmented-reality systems limited to redetermining lighting for a collective set of objects or for an entire image, the lighting estimation system can flexibly adapt lighting conditions for different positions to which a virtual object moves. Upon identifying a position-adjustment request to move a virtual object, for instance, the disclosed lighting estimation system can use a new local position indicator to modify an existing global feature map for a digital scene. By modifying a global feature map to reflect a new designated location, the lighting estimation system can generate new location-specific-lighting parameters for a new designated location-without having to redetermine lighting conditions for other objects or the entire image. Such flexibility enables users to manipulate objects in augmented-reality applications for mobile devices or other computing devices.

Independent of realism and flexibility, the disclosed lighting estimation system can also increase the speed with which an augmented-reality system renders a digital scene with location-specific lighting for virtual objects. Unlike lighting models that rely on examining an image's geometry or similar baseline parameters, the disclosed lighting estimation system uses a neural network that needs relatively fewer inputs to estimate lighting—that is, a digital scene and an indicator of a virtual object's position. By training a local-lighting-estimation-neural network to analyze such inputs, the lighting estimation system reduces the computing resources needed to quickly generate lighting parameters for a specific location within a digital scene.

Turning now to FIG. 1, this figure illustrates an augmented-reality system 108 and a lighting estimation system 110 using a neural network to estimate location-specific-lighting parameters. In general, and as shown in FIG. 1, the lighting estimation system 110 identifies a request to render a virtual object 106 at a designated position within a digital scene 102 and uses a local-lighting-estimation-neural network 112 to generate location-specific-lighting parameters 114 for the designated position. Based on the request, the augmented-reality system 108 in conjunction with the lighting estimation system 110 renders a modified digital scene 116 comprising the virtual object 106 at the designated position illuminated according to the location-specific-lighting parameters 114. While FIG. 1 depicts the augmented-reality system 108 comprising the lighting estimation system 110 and rendering the modified digital scene 116, the lighting estimation system 110 may alternatively render the modified digital scene 116 by itself.

As just noted, the lighting estimation system 110 identifies a request to render the virtual object 106 at a designated position within the digital scene 102. For instance, the lighting estimation system 110 may identify a digital request from a mobile device to render a virtual pillow (or other virtual item) at a particular position on a piece of furniture (or another real item) depicted in a digital image. Regardless of the types of objects or scenes from a request, in some embodiments, the request to render the digital scene includes an indication of a designated position at which to render a virtual object.

As used in this disclosure, the term "digital scene" refers to a digital image, model, or depiction of objects. For example, in some embodiments, a digital scene comprises a digital image of a realistic scene from a particular point of view or from multiple points of view. As a further example, a digital scene can comprise a three-dimensional-digital model of a scene. Regardless of format, the digital scene may include depictions of light from a light source. To illustrate but one example, a digital scene may comprise a digital image of a real room containing real walls, carpet, furniture, and people with light emanating from a lamp or a window. As discussed further below, a digital scene may be modified to include a virtual object in an adjusted or modified digital scene portraying augmented reality.

Relatedly, the term "virtual object" refers to a computer-generated-graphical object that does not exist in the physical world. For example, a virtual object may include an object created by a computer for use within an augmented-reality application. Such a virtual object may be, but is not limited to, virtual accessories, animals, clothing, cosmetics, footwear, fixtures, furniture, furnishings, hair, people, physical human features, vehicles, or any other graphical object created by a computer. This disclosure generally uses the word "virtual" to designate specific virtual objects (e.g., "virtual pillow" or "virtual shoe"), but generally refers to real objects without the word "real" (e.g., "bed," "couch").

As further indicated by FIG. 1, the lighting estimation system 110 identifies or generates a local position indicator 104 for the designated position in a rendering request. As used herein, the term "local position indicator" refers to a digital identifier for a location within a digital scene. For example, in certain implementations, a local position indicator includes a digital coordinate, pixel, or other marker indicating a designated position within a digital scene from a request to render a virtual object. To illustrate, a local position indicator may be a coordinate representing a designated position or a pixel (or coordinate for a pixel) corresponding to the designated position. Among other embodiments, the lighting estimation system 110 may generate (and input) a local position indicator into the local-lighting-estimation-neural network 112 or use the local-lighting-estimation-neural network 112 to identify one or more local position indicators from feature maps.

In addition to generating a local position indicator, the lighting estimation system 110 uses the local-lighting-estimation-neural network 112 to analyze one or both of the digital scene 102 and the local position indicator 104. For example, in some cases, the lighting estimation system 110 extracts a global feature map from the digital scene 102 using a first set of layers of the local-lighting-estimation-neural network 112. The lighting estimation system 110 can further modify the global feature map for the digital scene 102 based on the local position indicator 104 for the designated position.

As used herein, the term "global feature map" refers to a multi-dimensional array or multi-dimensional vector representing features of a digital scene (e.g., a digital image or three-dimensional-digital model). For instance, a global feature map for a digital scene may represent different visual or latent features of an entire digital scene, such as lighting or geometric features visible or embedded within a digital image or a three-dimensional-digital model. As explained below, one or more layers of a local-lighting-estimation-neural network outputs a global feature map for a digital scene.

The term "local-lighting-estimation-neural network" refers to an artificial neural network that generates lighting parameters indicating lighting conditions for a position within a digital scene. In particular, in certain implementations, a local-lighting-estimation-neural network refers to an artificial neural network that generates location-specific-lighting-parameters image indicating lighting conditions for a designated position corresponding to a virtual object within a digital scene. In some embodiments, a local-lighting-estimation-neural network comprises some or all of the following network layers: one or more layers from a densely connected convolutional network ("DenseNet"), convolutional layers, and fully connected layers.

After modifying a global feature map, the lighting estimation system 110 uses a second set of network layers of the local-lighting-estimation-neural network 112 to generate the location-specific-lighting parameters 114 based on a modified global feature map. As used in this disclosure, the term "location-specific-lighting parameters" refer to parameters that indicate lighting or illumination of a portion or position within a digital scene. For instance, in some embodiments, location-specific-lighting parameters define, specify, or otherwise indicate lighting or shading of pixels corresponding to a designated position of a digital scene. Such location-specific-lighting parameters may define the shade or hue of pixels for a virtual object at a designated position. In some embodiments, location-specific-lighting parameters comprise spherical-harmonic coefficients that indicate lighting conditions for a designated position within a digital scene for a virtual object. Accordingly, location-specific-lighting parameters may be functions corresponding to a sphere's surface.

As further shown in FIG. 1, in addition to generating such lighting parameters, the augmented-reality system 108 renders the modified digital scene 116 comprising the virtual object 106 at the designated position illuminated according to the location-specific-lighting parameters 114. For example, in some embodiments, the augmented-reality system 108 superimposes or otherwise integrates a computer-generated image of the virtual object 106 within the digital scene 102. As part of the rendering, the augmented-reality system 108 selects and renders pixels for the virtual object 106 that reflect lighting, shading, or appropriate color hues indicated by the location-specific-lighting parameters 114.

Figure 2:
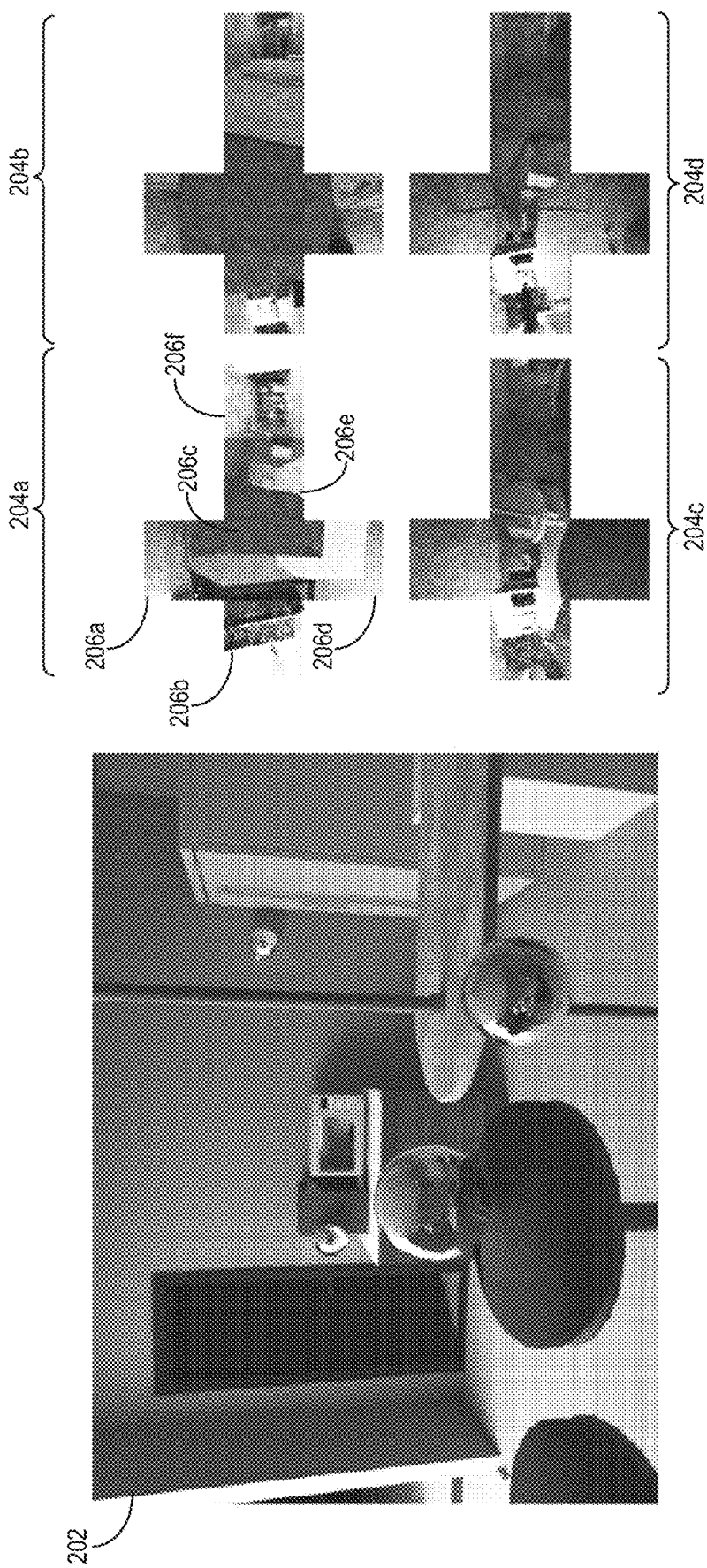
FIG. 2 illustrates a digital training scene and corresponding cube maps in accordance with one or more embodiments.

As suggested above, in some embodiments, the lighting estimation system 110 uses cube maps for digital scenes to project ground-truth-lighting parameters for designated positions of a digital scene. FIG. 2 illustrates examples of cube maps corresponding to a digital scene. As shown in FIG. 2, a digital training scene 202 includes a viewpoint of objects illuminated by a light source. To generate ground-truth-lighting parameters for training, in some cases, the lighting estimation system 110 selects and identifies positions within the digital training scene 202. The lighting estimation system 110 further generates cube maps 204a-204d corresponding to the identified positions, where each cube map represents an identified position within the digital training scene 202. The lighting estimation system 110 then projects the cube maps 204a-204d to ground-truth-spherical-harmonic coefficients for use in training a local-lighting-estimation-neural network.

The lighting estimation system 110 optionally generates or prepares digital training scenes, such as the digital training scene 202, by modifying images of realistic or computer-generated scenes. For instance, in some cases, the lighting estimation system 110 modifies three-dimensional scenes from Princeton University's SUNCG dataset, as described by Shuran Song et al., "Semantic Scene Completion from a Single Depth Image," *Proceedings of the IEEE Conference on Computer Vision and Pattern Recognition* (2017), the entire contents of which are incorporated by reference. The scenes in the SUNCG dataset generally comprise realistic rooms and furniture layouts. Based on the SUNCG dataset, the lighting estimation system 110 computes physically based image renderings of scenes. In some such cases, the lighting estimation system 110 uses a Mitsuba framework to compute the physically based renderings, as described by Yinda Zhang et al., "Physically-Based Rendering for Indoor Scene Understanding Using Convolutional Neural Networks," *Proceedings of the IEEE Conference on Computer Vision and Pattern Recognition* (2017) (hereinafter "Zhang"), the entire contents of which are incorporated by reference.

To remove some of the inaccuracies and biases in such renderings, in some embodiments, the lighting estimation system 110 alters the computational approach from Zhang's algorithm in some respects. First, the lighting estimation system 110 digitally removes lights that appear inconsistent with indoor scenes, such as area lights for floors, walls, and ceilings. Second, instead of using a single panorama for outdoor illumination as in Zhang, the researchers randomly select one panorama from a dataset of two hundred HDR outdoor panoramas and apply a random rotation around the Y-axis of the panorama. Third, instead of assigning the same intensity for each indoor area light, the lighting estimation system 110 randomly selects a light intensity between one hundred and five hundred candelas with a uniform distribution. In some implementations of generating digital training scenes, however, the lighting estimation system 110 uses the same rendering method and spatial resolution described by Zhang.

Because indoor scenes can include an arbitrary distribution of light sources and light intensity, the lighting estimation system 110 normalized each physically based rendering of a digital scene. When normalizing renderings, the lighting estimation system 110 uses the following equation:

$$I' = I * \frac{m}{P_{90}} \qquad (1)$$

In equation (1), I represents an original image rendering with HDR, I' represents the re-exposed image rendering, m is set to a value of 0.8, and $P_{90}$ represents the 90th percentile of the original image rendering I. By re-exposing the original image rendering I, the re-exposed image rendering I' still includes HDR values. The lighting estimation system 110 further applies a gamma tone-map operation with a random value between 1.8 and 2.2 to the re-exposed image rendering I' and clip all values above 1. By applying the gamma-tone-mapping operation, the lighting estimation system 110 can produce images with saturated bright windows and improved contrast in the scene.

As noted above, the lighting estimation system 110 identifies sample positions within a digital training scene, such as the digital training scene 202. As depicted in FIG. 2, the digital training scene 202 includes four spheres identifying four sample positions identified by the lighting estimation system 110. The digital training scene 202 includes the spheres for illustrative purposes. Accordingly, the spheres represent a visualization of sample positions identified by the lighting estimation system 110, not objects in the digital training scene 202.

To identify such sample positions, in some embodiments, the lighting estimation system 110 identifies four different quadrants of the digital training scene 202 with a margin of 20% of the image resolution from the image's borders. In each quadrant, the lighting estimation system 110 identifies one sample position.

As further indicated above, the lighting estimation system 110 generates the cube maps 204a-204d based on the sample positions from the digital training scene 202. As shown in FIG. 2, each of the cube maps 204a-204d include six visual portions in HDR representing six different perspectives of the digital training scene 202. The cub camp 204a, for instance, includes visual portions 206a-206e. In some cases, each of the cube maps 204a-204d include a 64×64×6 resolution. Such a resolution has a low impact on spherical harmonics of degree five or less and facilitates quick rendering of cube maps.

To render the cube maps 204a-204d, the lighting estimation system 110 can apply a two-stage Primary Sample Space Metropolis Light Transport ("PSSMLT") with 512 direct samples. When generating the visual portion of a cube map-such as the visual portion 206c—the lighting estimation system 110 translates the surface position in the direction of a surface normal 10 centimeters to minimize the risk of having a part of the cube map inside a surface of another object. In some implementations, the lighting estimation system 110 uses the same approach to identifying sample positions in digital training scenes and generating corresponding cube maps as precursors to determining ground-truth-location-specific-spherical-harmonic coefficients.

After generating the cube maps 204a-204d, for instance, the lighting estimation system 110 projects the cube maps 204a-204d to ground-truth-location-specific-spherical-harmonic coefficients for each identified position within the digital training scene 202. In some cases, the ground-truth-location-specific-spherical-harmonic coefficients comprise coefficients of degree five. To compute such spherical harmonics, in some embodiments, the lighting estimation system 110 applies a least-squared method for projecting cube maps.

For example, the lighting estimation system 110 may use the following equation for projecting cube maps:

$$f_l^m = \int f(s) y_l^m(s) \delta s \qquad (2)$$

In equation (2), f represents the light intensity for each direction shown by visual portions of a cube map, where a solid angle corresponding to a pixel position weights the light intensity. The symbols $y_l^m$ represent a spherical-harmonic function of the degree l and order m. In some cases, for each cube map, the lighting estimation system 110 computes spherical-harmonic coefficients of degree five (or some other degree) for each color channel (e.g., order of three), making for 36×3 spherical-harmonic coefficients.

In addition to generating ground-truth-location-specific-spherical-harmonic coefficients, in some embodiments, the lighting estimation system 110 further augments digital training scenes in particular ways. First, the lighting estimation system 110 randomly scales exposure to a uniform distribution between 0.2 and 4. Second, the lighting estimation system 110 randomly sets a gamma value for a tone-map operator to between 1.8 and 2.2. Third, the lighting estimation system 110 inverts the viewpoint of digital training scenes on the X-axis. Similarly, the lighting estimation system 110 flips the ground-truth-spherical-harmonic coefficients to match the inverted viewpoints by inverting the negative order harmonics as shown by the symbols $y_l^{-m}$.

Figure 3:
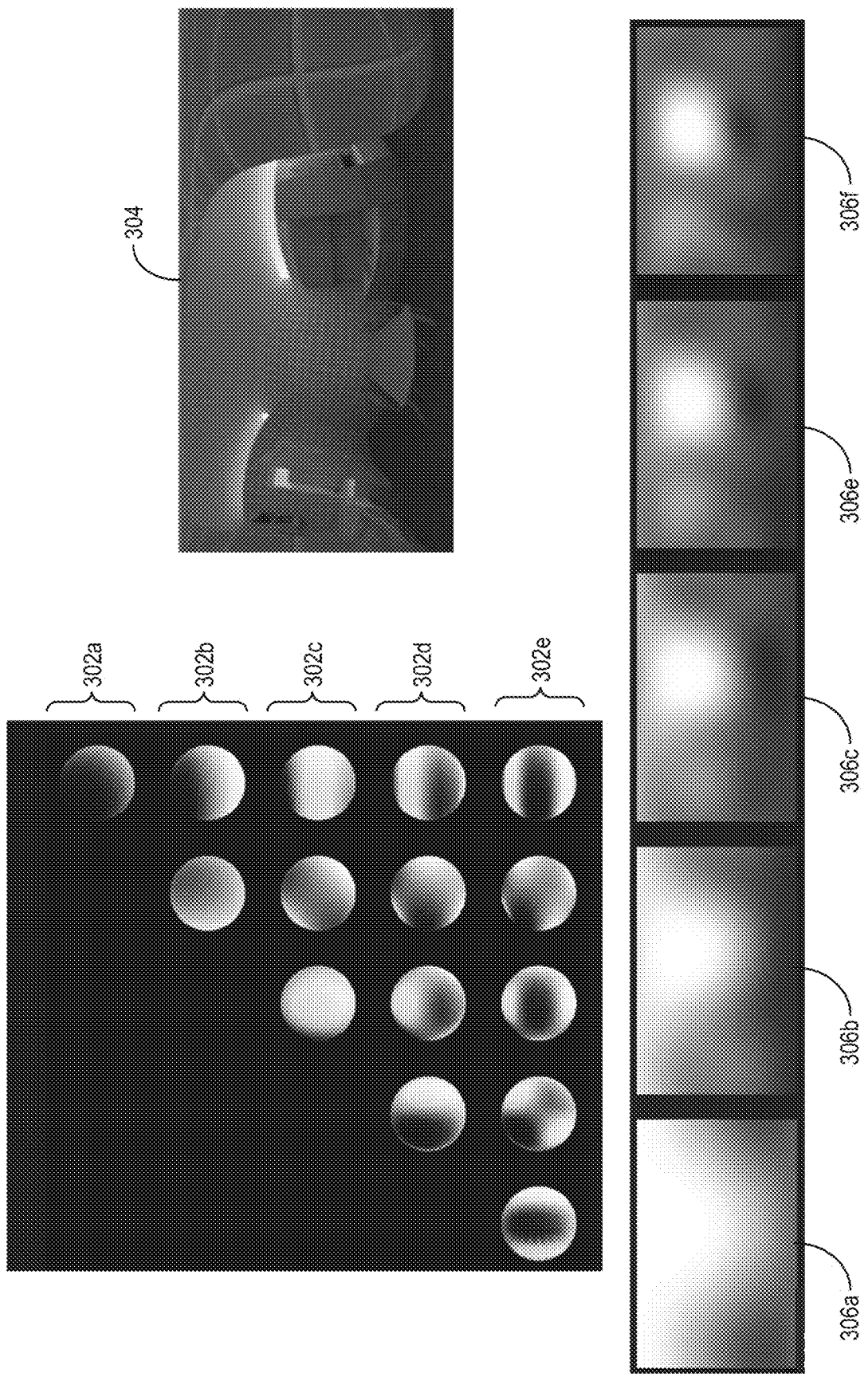
FIG. 3 illustrates degrees of location-specific-spherical-harmonic-training coefficients in accordance with one or more embodiments.

As further suggested above, in certain implementations, the lighting estimation system 110 can use varying degrees of spherical-harmonic coefficients. For instance, the lighting estimation system 110 can generate ground-truth-spherical-harmonic coefficients of degree five for each color channel or location-specific-spherical-harmonic coefficients of degree five for each color channel. FIG. 3 illustrates a visual representation of various degrees of spherical harmonics and lighting conditions of a full environment map for a position within a digital scene according to different degrees of spherical harmonics.

As shown in FIG. 3, visual representations 302a, 302b, 302c, 302d, and 302e respectively correspond to spherical harmonics of degrees one, two, three, four, and five. In particular, each of the visual representations 302a-302e includes one or more spheres in a row visually representing different degrees. As indicated by FIG. 3, with each incremental degree, the spherical-harmonic coefficients indicate more detailed lighting conditions.

To illustrate, FIG. 3 includes lighting depictions 306a-306e for a full-environment map 304 of a position within a digital scene. The lighting depictions 306a, 306b, 306c, 306d, and 306e respectively correspond to spherical-harmonic coefficients of degrees one, two, three, four, and five. As the degree of spherical harmonic increases, the lighting depictions 306a-306e better capture the lighting shown in the full-environment map 304. As the lighting depictions 306a-306e, spherical-harmonic coefficients can implicitly capture occlusion and geometry of a digital scene.

Figure 4A:
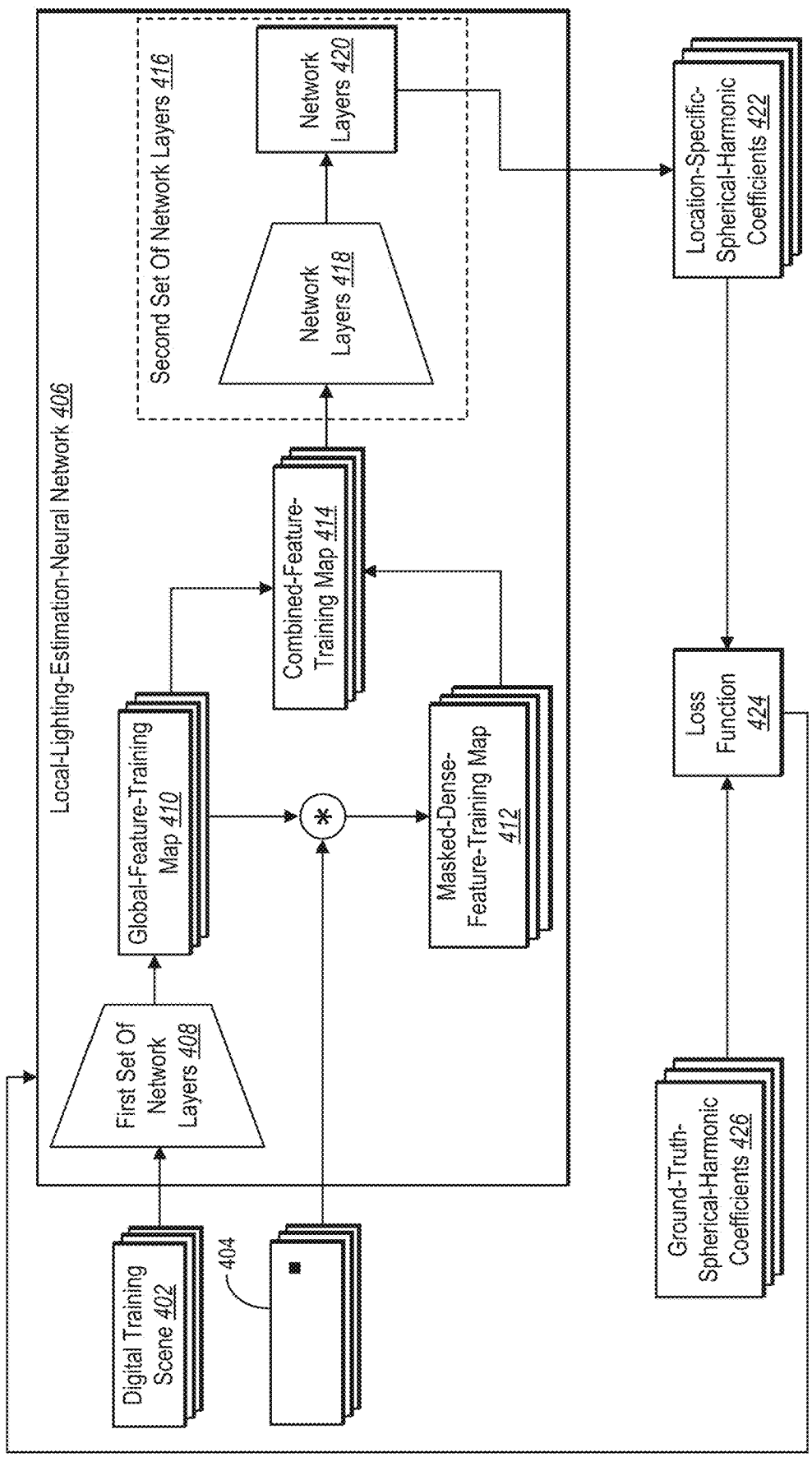
FIG. 4A illustrates a lighting estimation system training a local-lighting-estimation-neural network to generate location-specific-spherical-harmonic coefficients for designated positions within digital scenes in accordance with one or more embodiments.
Figure 4B:
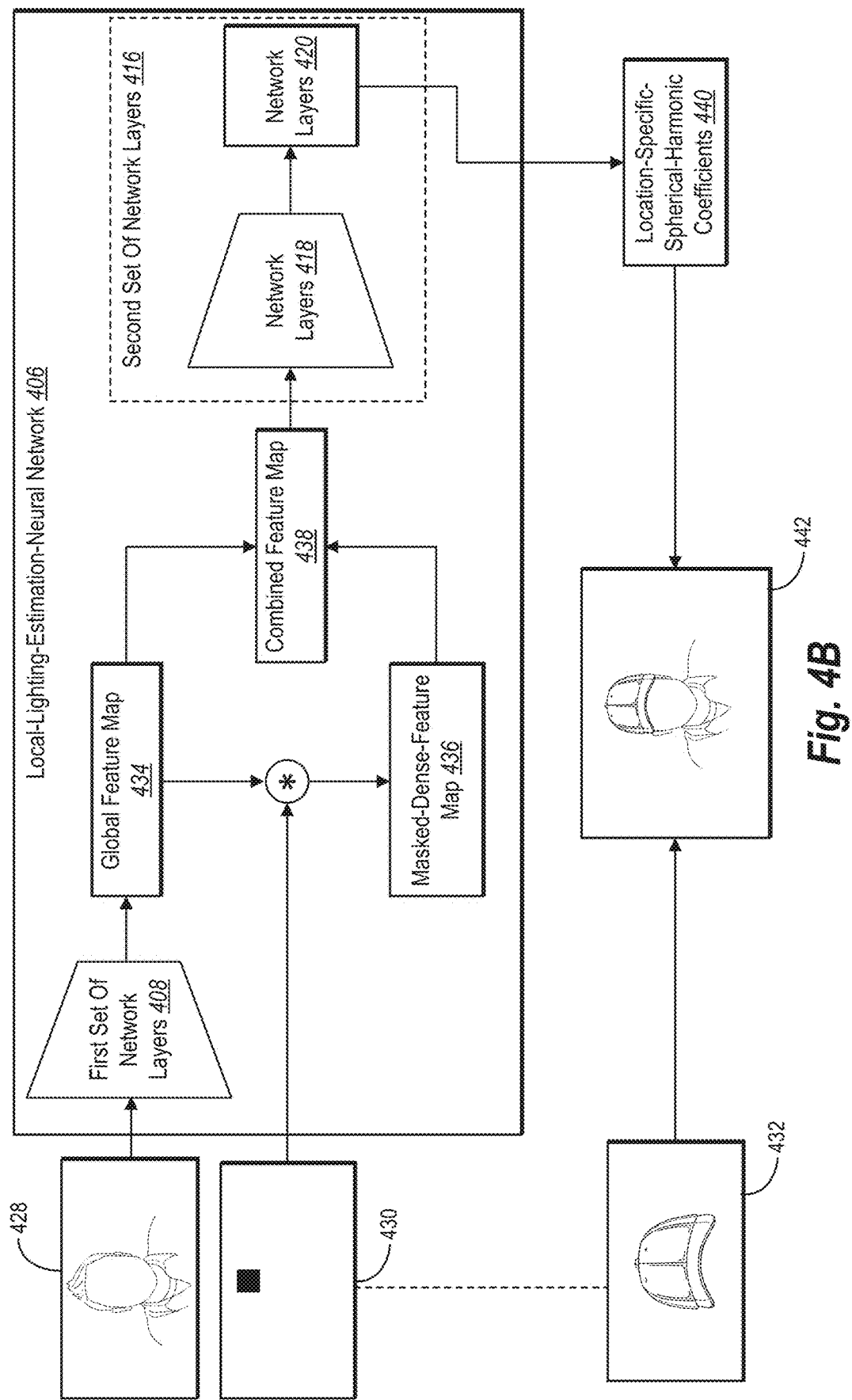
FIG. 4B illustrates a lighting estimation system using a trained local-lighting-estimation-neural network to generate location-specific-spherical-harmonic coefficients for a designated position within a digital scene in accordance with one or more embodiments.
Figure 5A:
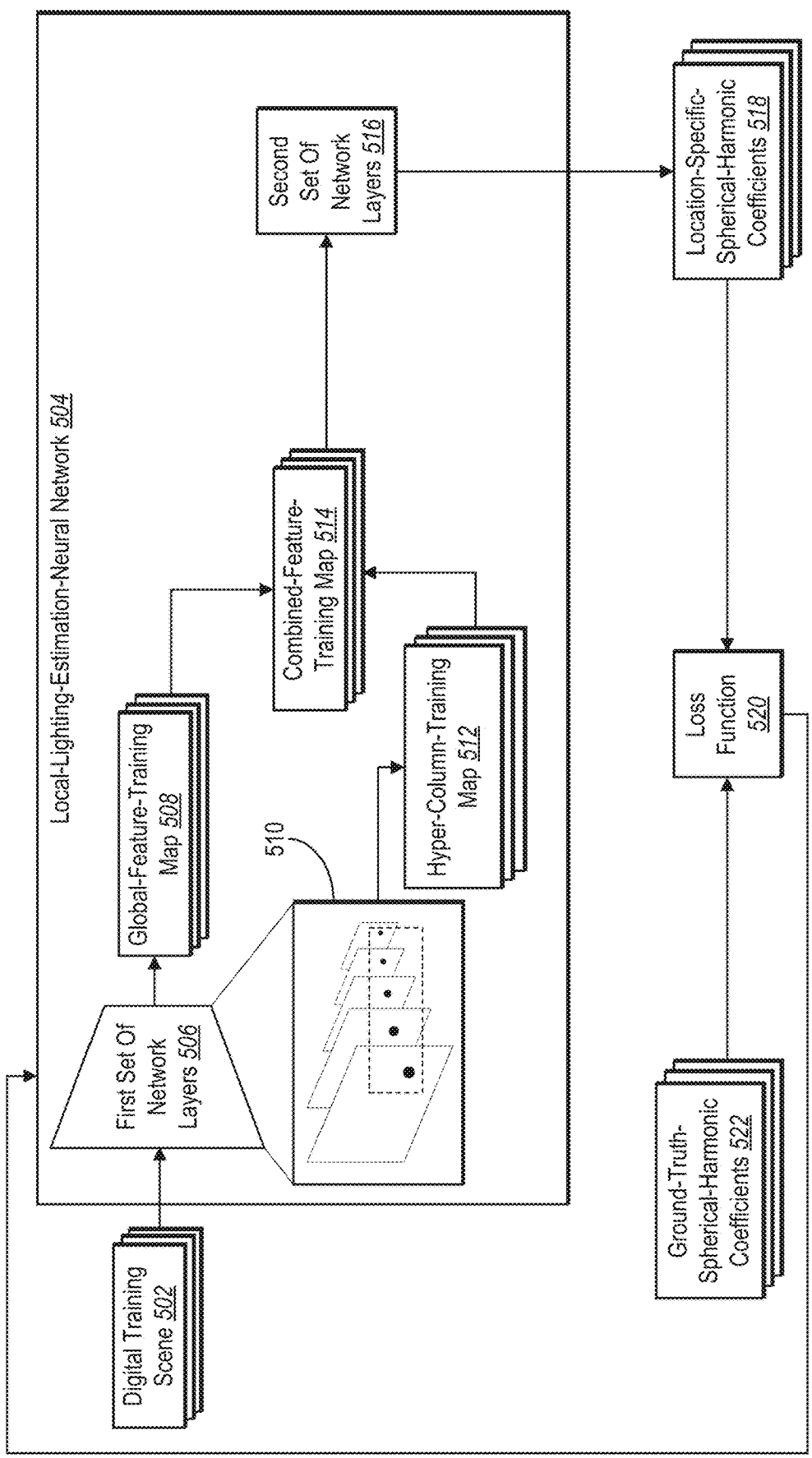
FIG. 5A illustrates a lighting estimation system training a local-lighting-estimation-neural network to generate location-specific-spherical-harmonic coefficients for designated positions within digital scenes using coordinates for feature maps from layers of the neural network in accordance with one or more embodiments.
Figure 5B:
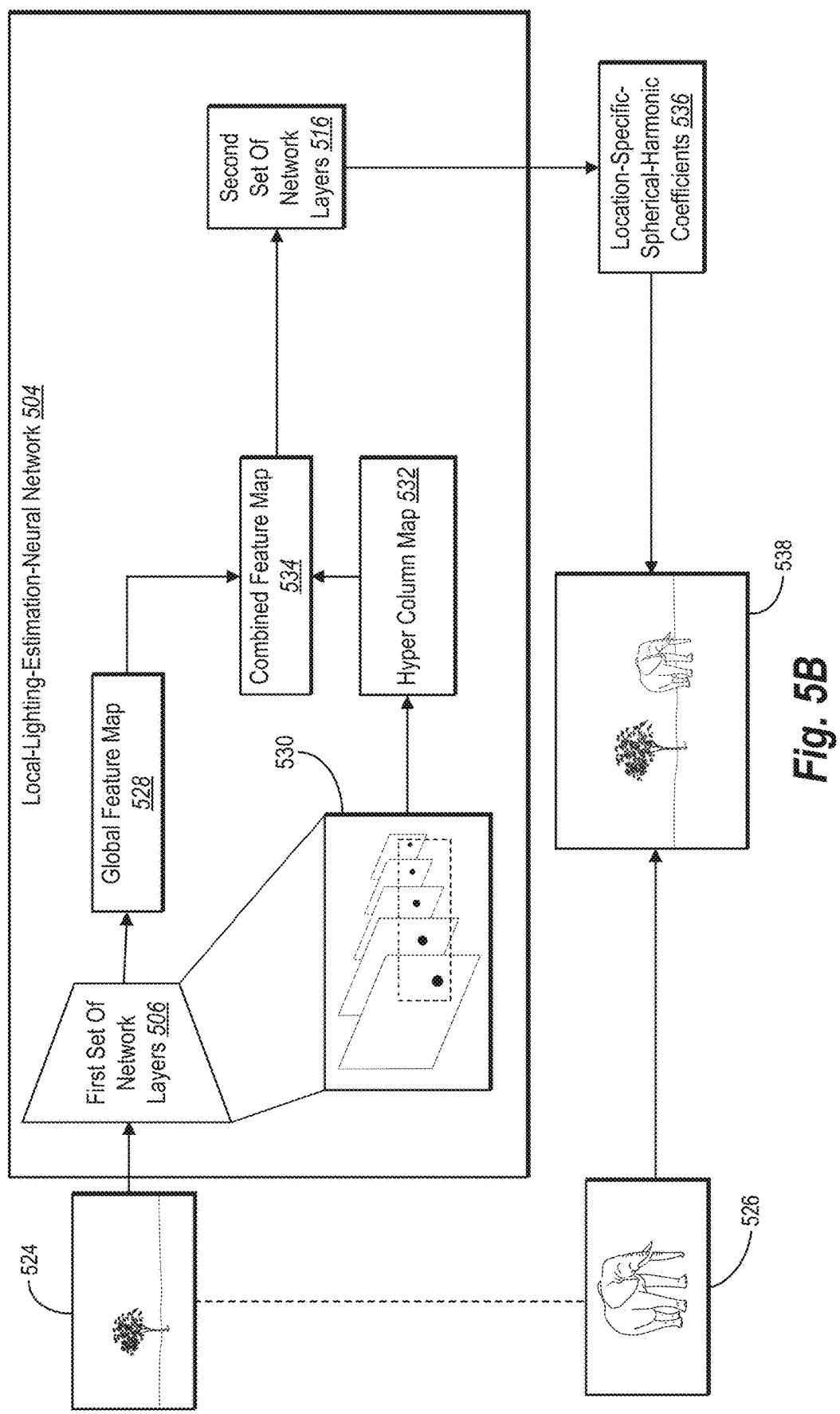
FIG. 5B illustrates a lighting estimation system using a trained local-lighting-estimation-neural network to generate location-specific-spherical-harmonic coefficients for a designated position within a digital scene using coordinates for feature maps from layers of the neural network in accordance with one or more embodiments in accordance with one or more embodiments.

As suggested above, the lighting estimation system 110 can use various architectures and inputs for a local-lighting-estimation-neural network. FIGS. 4A and 4B depict an example of the lighting estimation system 110 respectively training and applying a local-lighting-estimation-neural network to generate location-specific-lighting parameters. FIGS. 5A and 5B depict another embodiment of the lighting estimation system 110 respectively training and applying a local-lighting-estimation-neural network to generate location-specific-lighting parameters. Both such embodiments can use the digital training scenes and corresponding spherical-harmonic coefficients from cube maps as described with respect to FIGS. 2 and 3.

As shown in FIG. 4A, for example, the lighting estimation system 110 iteratively trains a local-lighting-estimation-neural network 406. As an overview of a training iteration, the lighting estimation system 110 extracts a global-feature-training map from a digital training scene using a first set of network layers 408 of the local-lighting-estimation-neural network 406. The lighting estimation system 110 further generates a local-position-training indicator for a designated position within the digital training scene and modifies the global-feature-training map based on the local-position-training indicator.

Based on modifications to the global-feature-training map reflected in a combined-feature-training map, the lighting estimation system 110 generates location-specific-spherical-harmonic coefficients for the designated position using a second set of network layers 416 of the local-lighting-estimation-neural network 406. The lighting estimation system 110 then modifies network parameters of the local-lighting-estimation-neural network 406 based on a comparison of the location-specific-spherical-harmonic-coefficients with ground-truth-spherical-harmonic-coefficients for the designated position within the digital training scene.

As shown in FIG. 4A, for example, the lighting estimation system 110 feeds a digital training scene 402 to the local-lighting-estimation-neural network 406. Upon receiving the digital training scene 402 as a training input, the first set of network layers 408 extract a global-feature-training map 410 from the digital training scene 402. In some such embodiments, the global-feature-training map 410 represents visual features of the digital training scene 402, such as light-source positions and global geometry of the digital training scene 402.

As suggested above, in certain implementations, the first set of network layers 408 comprises layers of a DenseNet, such as various lower layers of a DenseNet. For instance, the first set of network layers 408 may include a convolutional layer followed by a Dense Block and (in some cases) one or more sets of a convolutional layer, a pooling layer, and a Dense Block. In some cases, the first set of network layers 408 comprise layers from DenseNet 120, as described by G. Huang et al., "Densely Connected Convolutional Layers," *Proceedings of the IEEE Conference on Computer Vision and Pattern Recognition* (2017) (hereinafter, "Huang"), the entire contents of which are incorporated by reference. The lighting estimation system 110 optionally initializes network parameters for layers of a DenseNet using weights trained on an ImageNet, as described by Olga Russakovsky et al., "ImageNet Large Scale Visual Recognition Challenge," Vol. 30, Issue No. 3 *International Journal of Computer Vision* 211-252 (2015) (hereinafter, "Russakovsky"), the entire contents of which are incorporated by reference. Regardless of the architecture of how network parameters are initialized for the first set of network layers 408, the first set of network layers 408 optionally outputs the global-feature-training map 410 in the form of a dense feature map corresponding to the digital training scene 402.

In the alternative to layers of a DenseNet, the first set of network layers 408 comprises an encoder from a Convolutional Neural Network ("CNN"), including a couple of convolutional layers followed by four residual layers. In some such embodiments, the first set of network layers 408 comprises the encoder described by Marc-André Gardner et al., "Learning to Predict Indoor Illumination from a Single Image," Vol. 36, Article No. 6, *ACM Transactions on Graphics* (2017) (hereinafter, "Gardner"), the entire contents of which are incorporated by reference. Accordingly, as an encoder, the first set of network layers 408 optionally outputs the global-feature-training map 410 in the form of an encoded feature map of the digital training scene 402.

As further shown in FIG. 4A, the lighting estimation system 110 identifies or generates a local-position-training indicator 404 for a designated position within the digital training scene 404. For instance, the lighting estimation system 110 can identify local-position-training coordinates representing a designated position within the digital training scene 402. Such coordinates may represent two-dimensional coordinates of a sample position within the digital training scene 402 corresponding to a cube map (and ground-truth-spherical-harmonic coefficients) generated by the lighting estimation system 110.

Having identified the local-position-training indicator 404, the lighting estimation system 110 uses the local-position-training indicator 404 to modify the global-feature-training map 410. In some cases, for example, the lighting estimation system 110 uses the local-position-training indicator 404 to mask the global-feature-training map 410. For instance, the lighting estimation system 110 optionally generates a masking-feature-training map from the local-position-training indicator 404, such as by applying a vector encoder to the local-position-training indicator 404 (e.g., by one-hot encoding). In some implementations, the masking-feature-training map includes an array of values indicating the local-position-training indicator 404 for the designated position within the digital training scene 402, such as one or more values of the number one indicating coordinates for a designated position within the digital training scene 402 and other values (e.g., the number zero) indicating coordinates for other positions within the digital training scene 402.

As further indicated by FIG. 4A, the lighting estimation system 110 multiplies the global-feature-training map 410 and a masking-feature-training map for the local-position-training indicator 404 to generate a masked-dense-feature-training map 412. Because the masking-feature-training map and the global-feature-training map 410 can comprise the same spatial resolution, in some embodiments, the masking-feature-training map effectively masks the global-feature-training map 410 to create the masked-dense-feature-training map 412. The masked-dense-feature-training map 412 accordingly represents a local feature map for a designated position within the digital training scene 402.

Upon generating the masked-dense-feature-training map 412, in some embodiments, the lighting estimation system 110 concatenates the global-feature-training map 410 and the masked-dense-feature-training map 412 to form a combined-feature-training map 414. For example, the lighting estimation system 110 couples the global-feature-training map 410 and the masked-dense-feature-training map 412 together to form a dual or stacked feature map as the combined-feature-training map 414. Alternatively, in certain implementations, the lighting estimation system 110 combines rows of values from the global-feature-training map 410 with rows of values from the masked-dense-feature-training map 412 to form the combined-feature-training map 414. But any suitable concatenation method may be used.

As further shown in FIG. 4A, the lighting estimation system 110 feeds the combined-feature-training map 414 to the second set of network layers 416 of the local-lighting-estimation-neural network 406. As indicated by FIG. 4A, the second set of network layers 416 includes one or both of network layers 418 and 420 and can comprise a regressor. In certain implementations, for instance, the second set of network layers 416 includes convolutional layers as the network layers 418 and fully connected layers as the network layers 420. The second set of network layers 416 optionally includes a max pooling layer in between convolutional layers that constitute the network layers 418 and a dropout layer before fully connected layers that constitute the network layers 420. As part of a training iteration with such layers, the lighting estimation system 110 optionally passes the combined-feature-training map 414 through a couple convolutional layers and a couple fully connected layers with batch normalization and an Exponential Learning Unit ("ELU") learning function.

After passing the combined-feature-training map 414 through the second set of network layers 416, the local-lighting-estimation-neural network 406 outputs the location-specific-spherical-harmonic-training coefficients 422. Consistent with the disclosure above, the location-specific-spherical-harmonic-training coefficients 422 indicate lighting conditions for a designated position within the digital training scene 402. For example, the location-specific-spherical-harmonic-training coefficients 422 indicate lighting conditions for a designated position within the digital training scene 402 identified by the local-position-training indicator 404.

After generating the location-specific-spherical-harmonic-training coefficients 422, the lighting estimation system 110 compares the location-specific-spherical-harmonic-training coefficients 422 with ground-truth-spherical-harmonic coefficients 426. As used in this disclosure, the term "ground-truth-spherical-harmonic coefficients" refers to empirically determined spherical-harmonic coefficients from one or more cube maps. The ground-truth-spherical-harmonic coefficients 426, for instance, represent spherical-harmonic coefficients projected from a cube map corresponding to a position within the digital training scene 402 identified by the local-position-training indicator 404.

As further indicated by FIG. 4A, the lighting estimation system 110 uses a loss function 424 to compare the location-specific-spherical-harmonic-training coefficients 422 with the ground-truth-spherical-harmonic coefficients 426. In some embodiments, the lighting estimation system 110 uses a mean-squared-error ("MSE") function as the loss function 424. Alternatively, in certain implementations, the lighting estimation system 110 uses an L2-loss function, mean-absolute-error function, a mean-absolute-percentage-error function, a render-loss function, a root-mean-squared-error function, or other suitable loss function as the loss function 424.

Upon determining a loss from the loss function 424, the lighting estimation system 110 modifies network parameters (e.g., weights or values) of the local-lighting-estimation-neural network 406 to decrease a loss for the loss function 424 in a subsequent training iteration using back propagation as shown by the arrow from the loss function 434 to the local-lighting-estimation neural network 406. For example, the lighting estimation system 110 may increase or decrease weights or values from some (or all) of the first set of network layers 408 or the second set of network layers 416 within the local-lighting-estimation-neural network 406 to decrease or minimize a loss in a subsequent training iteration.

After modifying network parameters of the local-lighting-estimation-neural network 406 for an initial training iteration, the lighting estimation system 110 can perform additional training iterations. In a subsequent training iteration, for instance, the lighting estimation system 110 extracts an additional global-feature-training map for an additional digital training scene, generates an additional local-position-training indicator for a designated position within the additional digital training scene, and modifies the additional global-feature-training map based on the additional local-position-training indicator. Based on an additional combined-feature-training map, the lighting estimation system 110 generates additional location-specific-spherical-harmonic-training coefficients for the designated position.

The lighting estimation system 110 subsequently modifies network parameters of the local-lighting-estimation-neural network 406 based on a loss from the loss function 424 comparing the additional location-specific-spherical-harmonic-training coefficients with additional ground-truth-spherical-harmonic-coefficients for the designated position within the additional digital training scene. In some cases, the lighting estimation system 110 performs training iterations until the value or weights of the local-lighting-estimation-neural network 406 do not change significantly across training iterations or otherwise satisfies a convergence criteria.

To arrive at a point of convergence, the lighting estimation system 110 optionally trains a local-lighting-estimation-neural network 406 shown in FIG. 4A or 5A (the latter described below) using mini-batches of 20 digital training scenes and an Adam optimizer that minimizes a loss across training iterations with a learning rate of 0.0001 and a weight decay of 0.0002. During some such training experiments, the lighting estimation system 110 reached a point of convergence faster when generating location-specific-spherical-harmonic-training coefficients of a degree above zero, such as a degree five.

The lighting estimation system 110 also uses a trained local-lighting-estimation-neural network to generate location-specific-lighting parameters. FIG. 4B depicts an example of one such application. In general, and as shown in FIG. 4B, the lighting estimation system 110 identifies a request to render a virtual object 432 at a designated position within a digital scene 428. The lighting estimation system 110 uses the local-lighting-estimation-neural network 406 to analyze both the digital scene 428 and a local position indicator 430 to generate location-specific-spherical-harmonic coefficients 440 for the designated position. Based on the request, the lighting estimation system 110 renders a modified digital scene 442 comprising the virtual object 432 at the designated position illuminated according to the location-specific-spherical-harmonic coefficients 440.

As just noted, the lighting estimation system 110 identifies a request to render the virtual object 432 at a designated position within the digital scene 428. For instance, the lighting estimation system 110 may identify a digital request from a computing device executing an augmented-reality application to render a virtual head accessory (or other virtual item) at a particular position on a person (or another real item) depicted in the digital scene 428. As indicated by FIG. 4B, the request to render the virtual object 432 includes the local position indicator 430 for a designated position at which to render the virtual object 432.

Based on receiving the request indicated by FIG. 4B, the lighting estimation system 110 inputs the digital scene 428 into the local-lighting-estimation-neural network 406. In particular, the lighting estimation system 110 feeds the digital scene 428 to the first set of network layers 408 for the first set of network layers 408 to extract a global feature map 434 from the digital scene 428. As indicated above, the first set of network layers 408 optionally comprises layers from a DenseNet and outputs a dense feature map as the global feature map 434. Alternatively, the first set of network layers 408 optionally comprises an encoder and outputs an encoded feature map as the global feature map 434.

As further shown in FIG. 4B, the lighting estimation system 110 generates the local position indicator 430 for a designated location within the digital scene 428. For example, in some embodiments, the lighting estimation system 110 identifies the local position indicator 430 from the request to render the virtual object 432 (e.g., with a local position indicator as two-dimensional or three-dimensional coordinates within the digital scene 428). The lighting estimation system 110 subsequently modifies the global feature map 434 based on the local position indicator 430.

To make such a modification, the lighting estimation system 110 can use the local position indicator 430 to mask the global feature map 434. In some implementations, for instance, the lighting estimation system 110 generates a masking feature map from the local position indicator 430, such as by applying a vector encoder to the local position indicator 430 (e.g., by one-hot encoding). As indicated above, the masking feature map can include an array of values (e.g., ones and zeros) indicating the local position indicator 430 for the designated position within the digital scene 428.

As further indicated by FIG. 4B, the lighting estimation system 110 multiplies the global feature map 434 and a masking feature map for the local position indicator 430 to generate a masked-dense-feature map 436. Given that the masking feature map and the global feature map 434 comprise the same spatial resolution, in some embodiments, the masking feature map effectively masks the global feature map 434 to create the masked-dense-feature map 436. The masked-dense-feature map 436 accordingly represents a local feature map for a designated position within the digital scene 428.

Upon generating the masked-dense-feature map 436, in some embodiments, the lighting estimation system 110 concatenates the global feature map 434 and the masked-dense-feature map 436 to form a combined feature map 438. To form the combined feature map 438, the lighting estimation system 110 can use any concatenation method described above. The lighting estimation system 110 subsequently feeds the combined feature map 438 to the second set of network layers 416.

By passing the combined feature map 438 through the second set of network layers 416, the local-lighting-estimation-neural network 406 outputs the location-specific-spherical-harmonic coefficients 440. Consistent with the disclosure above, the location-specific-spherical-harmonic coefficients 440 indicate lighting conditions for a designated position within the digital scene 428, such as the designated position identified by the local position indicator 430.

After generating such lighting parameters, the lighting estimation system 110 renders the modified digital scene 442 comprising the virtual object 432 at the designated position illuminated according to the location-specific-spherical-harmonic coefficients 440. For example, in some embodiments, the lighting estimation system 110 superimposes or otherwise integrates a computer-generated image of the virtual object 432 within the digital scene 428. As part of the rendering, the lighting estimation system 110 selects and renders pixels for the virtual object 432 that reflect lighting, shading, or appropriate color hues indicated by the location-specific-spherical-harmonic coefficients 440.

As noted above, FIGS. 5A and 5B depict another embodiment of the lighting estimation system 110 respectively training and applying a local-lighting-estimation-neural network to generate location-specific-lighting parameters. As shown in FIG. 5A, for example, the lighting estimation system 110 iteratively trains a local-lighting-estimation-neural network 504. As an overview of a training iteration, the lighting estimation system 110 extracts a global-feature-training map from a digital training scene using a first set of network layers 506 of the local-lighting-estimation-neural network 504. The lighting estimation system 110 further generates multiple local-position-training indicators for a designated position within the digital training scene from feature maps output by layers of the first set of network layers. The lighting estimation system 110 subsequently modifies the global-feature-training map based on the local-position-training indicators.

Based on a combined-feature-training map from modifying global-feature-training map, the lighting estimation system 110 generates location-specific-spherical-harmonic coefficients for the designated position using a second set of network layers 516 of the local-lighting-estimation-neural network 504. The lighting estimation system 110 then modifies network parameters of the local-lighting-estimation-neural network 504 based on a comparison of the location-specific-spherical-harmonic-coefficients with ground-truth-spherical-harmonic-coefficients for the designated position within the digital training scene.

As shown in FIG. 5A, for instance, the lighting estimation system 110 feeds a digital training scene 502 to the local-lighting-estimation-neural network 504. Upon receiving the digital training scene 504 as a training input, the first set of network layers 506 extract a global-feature-training map 508 from the digital training scene 502. In some embodiments, the first set of network layers 506 comprise layers from a DenseNet and output the global-feature-training map 508 in the form of a dense feature map, such as the output from various Dense Blocks described by Huang. In some such implementations, the first set of network layers 506 further comprise a couple convolutional layers and a max pooling layer, which reduce the resolution of the global-feature-training map 508. In the alternative to DenseNet layers, the first set of network layers 506 can comprise an encoder and output the global-feature-training map 508 in the form of an encoded feature map, such as the output of the encoder described by Gardner. Independent of its form, the global-feature-training map 508 can represent visual features of the digital training scene 502, such as light-source positions and global geometry of the digital training scene 502.

In addition to generating the global-feature-training map 508, the lighting estimation system 110 identifies a feature-training map from each of various layers of the first set of network layers 506. As shown in FIG. 5A, for example, the various layers from the first set of network layers 506 collectively output feature-training maps 510 that include each such feature-training map. The lighting estimation system 110 selects a training pixel corresponding to a designated position within the digital training scene 502 from each feature-training map of the feature-training maps 510. For instance, the lighting estimation system 110 optionally selects coordinates for each training pixel corresponding to the designated position from each feature-training map. Each training pixel (or corresponding coordinates) represent a local-position-training indicator for the designated position.

As further shown in FIG. 5A, the lighting estimation system 110 generates a hyper-column-training map 512 from training pixels selected from the feature-training maps 510. For example, in some embodiments, the lighting estimation system 110 combines or concatenates each selected training pixel to form the hyper-column-training map 512, such as by concatenating features from each selected pixel. The hyper-column-training map 512 accordingly represents local features of the designated position within the digital training scene 502. In some such embodiments, the lighting estimation system 110 generates a hyper column map as described by Aayush Bansal et al., "Marr Revisited: 2D-3D Model Alignment via Surface Normal Prediction," *Proceedings of the IEEE Conference on Computer Vision and Pattern Recognition* (2016), or by Bharath Hariharan et al., "Hypercolumns for Object Segmentation and Fine-Grained Localization," *Proceedings of the IEEE Conference on Computer Vision and Pattern Recognition* (2015), the entire contents of both articles are incorporated by reference.

Upon generating the hyper-column-training map 512, in some embodiments, the lighting estimation system 110 concatenates the global-feature-training map 508 and the hyper-column-training map 512 to form a combined-feature-training map 514. To form the combined-feature-training map 514, the lighting estimation system 110 optionally (i) couples the global-feature-training map 508 and the hyper-column-training map 512 together to form a dual or stacked feature map or (ii) combines rows of values from the global-feature-training map 508 with rows of values from the hyper-column-training map 512. But any suitable concatenation method may be used.

As further shown in FIG. 5A, the lighting estimation system 110 feeds the combined-feature-training map 514 to the second set of network layers 516 of the local-lighting-estimation-neural network 504. In certain implementations, for instance, the second set of network layers 516 includes fully connected layers. As part of a training iteration with such layers, the lighting estimation system 110 optionally passes the combined-feature-training map 514 through a couple fully connected layers with batch normalization and an ELU learning function.

After passing the combined-feature-training map 514 through the second set of network layers 516, the local-lighting-estimation-neural network 504 outputs the location-specific-spherical-harmonic-training coefficients 518. Consistent with the disclosure above, the location-specific-spherical-harmonic-training coefficients 518 indicate lighting conditions for a designated position within the digital training scene 502. For example, the location-specific-spherical-harmonic-training coefficients 518 indicate lighting conditions for the designated position within the digital training scene 502 identified by the local-position-training indicators from the feature-training maps 510.

After generating the location-specific-spherical-harmonic-training coefficients 518, the lighting estimation system 110 compares the location-specific-spherical-harmonic-training coefficients 518 with ground-truth-spherical-harmonic coefficients 522. The ground-truth-spherical-harmonic coefficients 522 represent spherical-harmonic coefficients projected from a cube map corresponding to a sample position within the digital training scene 502—that is, the same designated position indicated by the local-position-training indicators from the feature-training maps 510.

As further indicated by FIG. 5A, the lighting estimation system 110 uses a loss function 520 to compare the location-specific-spherical-harmonic-training coefficients 518 with the ground-truth-spherical-harmonic coefficients 522. In some embodiments, the lighting estimation system 110 uses an MSE function as the loss function 520. Alternatively, in certain implementations, the lighting estimation system 110 uses an L2-loss function, mean-absolute-error function, a mean-absolute-percentage-error function, a render-loss function, a root-mean-squared-error function, or other suitable loss function as the loss function 520.

Upon determining a loss from the loss function 520, the lighting estimation system 110 modifies network parameters (e.g., weights or values) of the local-lighting-estimation-neural network 504 to decrease a loss for the loss function 520 in a subsequent training iteration. For example, the lighting estimation system 110 may increase or decrease weights or values from some (or all) of the first set of network layers 506 or the second set of network layers 516 within the local-lighting-estimation-neural network 504 to decrease or minimize a loss in a subsequent training iteration.

After modifying network parameters of the local-lighting-estimation-neural network 504 for an initial training iteration, the lighting estimation system 110 can perform additional training iterations. In a subsequent training iteration, for instance, the lighting estimation system 110 extracts an additional global-feature-training map for an additional digital training scene, generates additional local-position-training indicators for a designated position within the additional digital training scene, and modifies the additional global-feature-training map based on the additional local-position-training indicators. Based on an additional combined-feature-training map, the lighting estimation system 110 generates additional location-specific-spherical-harmonic-training coefficients for the designated position.

The lighting estimation system 110 subsequently modifies network parameters of the local-lighting-estimation-neural network 504 based on a loss from the loss function 520 comparing the additional location-specific-spherical-harmonic-training coefficients with additional ground-truth-spherical-harmonic-coefficients for a designated position within the additional digital training scene. In some cases, the lighting estimation system 110 performs training iterations until the value or weights of the local-lighting-estimation-neural network 504 do not change significantly across training iterations or otherwise satisfies a convergence criteria.

FIG. 5B depicts an example of using the local-lighting-estimation-neural network 504 to generate location-specific-lighting parameters. In general, and as shown in FIG. 5B, the lighting estimation system 110 identifies a request to render a virtual object 526 at a designated position within a digital scene 524. The lighting estimation system 110 uses the local-lighting-estimation-neural network 504 to analyze both the digital scene 524 and multiple local position indicators to generate location-specific-spherical-harmonic coefficients 536 for the designated position. Based on the request, the lighting estimation system 110 renders a modified digital scene 538 comprising the virtual object 526 at the designated position illuminated according to the location-specific-spherical-harmonic coefficients 536.

As just noted, the lighting estimation system 110 identifies a request to render the virtual object 526 at a designated position within the digital scene 524. For instance, the lighting estimation system 110 may identify a digital request from a computing device to render a virtual animal or character (or other virtual item) at a particular position on a landscape (or another real item) depicted in the digital scene 524. Although not shown by FIG. 5B, the request to render the virtual object 526 includes an indication of a designated position within the digital scene 524 at which to render the virtual object 526.

Based on receiving the request indicated by FIG. 5B, the lighting estimation system 110 inputs the digital scene 524 into the local-lighting-estimation-neural network 504. In particular, the lighting estimation system 110 feeds the digital scene 524 to the first set of network layers 506 to extract a global feature map 528 from the digital scene 524. As indicated above, the first set of network layers 506 optionally comprises layers from a DenseNet and outputs a dense feature map as the global feature map 528. Alternatively, the first set of network layers 506 optionally comprises an encoder and outputs an encoded feature map as the global feature map 528.

As further shown in FIG. 5B, the lighting estimation system 110 identifies a feature map from each of various layers from the first set of network layers 506. As shown in FIG. 5B, for example, the various layers from the first set of network layers 506 collectively output feature maps 530—including each such feature map. The lighting estimation system 110 selects a pixel corresponding to a designated position within the digital scene 524 from each feature map of the feature maps 510. For instance, the lighting estimation system 110 selects coordinates for each pixel corresponding to the designated position from each feature map.

As further shown in FIG. 5B, the lighting estimation system 110 generates a hyper column map 532 from pixels selected from the feature maps 530. For example, in some embodiments, the lighting estimation system 110 combines or concatenates each selected pixel to form the hyper column map 532, such as by concatenating features from each selected pixel. The hyper column map 532 accordingly represents local features of the designated position within the digital scene 524.

Upon generating the hyper column map 532, in some embodiments, the lighting estimation system 110 concatenates the global feature map 528 and the hyper column map 532 to form a combined feature map 534. To form the combined feature map 534, the lighting estimation system 110 can use any concatenation method described above. The lighting estimation system 110 then feeds the combined feature map 534 to the second set of network layers 516.

By passing the combined feature map 534 through the second set of network layers 516, the local-lighting-estimation-neural network 504 outputs the location-specific-spherical-harmonic coefficients 536. Consistent with the disclosure above, the location-specific-spherical-harmonic coefficients 536 indicate lighting conditions for a designated position within the digital scene 524, such as the designated position identified by the local position indicators from the feature maps 530.

After generating such lighting parameters, the lighting estimation system 110 renders the modified digital scene 538 comprising the virtual object 526 at the designated position illuminated according to the location-specific-spherical-harmonic coefficients 536. For example, in some embodiments, the lighting estimation system 110 superimposes or otherwise integrates a computer-generated image of the virtual object 526 within the digital scene 524. As part of the rendering, the lighting estimation system 110 selects and renders pixels for the virtual object 526 that reflect lighting, shading, or appropriate color hues indicated by the location-specific-spherical-harmonic coefficients 536.

In addition to accurately portraying lighting conditions at designated positions, the location-specific-spherical-harmonic coefficients generated in FIGS. 4B and 5B can dynamically capture lighting from different perspectives of a designated position within a digital scene. As a digital scene changes in perspective in camera viewpoint, model orientation, or other perspective adjustment, in some embodiments, the location-specific-spherical-harmonic coefficients can still accurately indicate lighting conditions for the designated position despite such perspective changes. For example, in some embodiments, the lighting estimation system 110 identifies a perspective-adjustment request to render a digital scene from a different point of view, such as by detecting movement of a mobile device reorienting the digital scene or identifying a user input modifying the perspective of the digital scene (e.g., a camera movement adjusting the perspective). Based on the perspective-adjustment request, the lighting estimation system 110 can render a modified digital scene from the different point of view comprising the virtual object at the designated position illuminated according to the location-specific-spherical-harmonic coefficients generated in FIG. 4B or 5B.

Alternatively, in certain implementations, the lighting estimation system 110 adjusts or generates new location-specific-lighting parameters in response to a perspective-adjustments and corresponding changes in point of view for a digital scene (e.g., a camera movement adjusting the perspective). For instance, in some embodiments, the lighting estimation system 110 identifies a perspective-adjustment request to render a virtual object at a designated position within a digital scene from a new or different point of view. Based on such a perspective-adjustment request, the lighting estimation system 110 can generate new location-specific-lighting parameters consistent with FIG. 4B or 5B above.

In some cases, for example, the lighting estimation system 110 generates a new local position indicator for the designated position within the digital scene from a different point of view (e.g., new coordinates for a new designated position as in FIG. 4B or new coordinates for pixels corresponding to a new designated position from each feature map as in FIG. 5B). The lighting estimation system 110 subsequently modifies a global feature map for the digital scene based on the new local position indicator for the designated position from the different point of view to form a new modified global feature map (e.g., concatenating a new global feature map and a new masked-dense-feature map to form a new combined feature map as shown in FIG. 4B or concatenating a new global feature map and a new hyper column map to form a new combined feature map as shown in FIG. 5B). Based on the new modified global feature map, the lighting estimation system 110 generates new location-specific-lighting parameters for the designated position from the different point of view using a second set of network layers (e.g., the second set of network layers 416 in FIG. 4B or the second set of network layers 516 in FIG. 5B). In response to the perspective-adjustment request, the lighting estimation system 110 accordingly renders an adjusted digital scene comprising the virtual object at the designated position illuminated according to the new location-specific-lighting parameters.

In addition to the location-specific-spherical-harmonic coefficients and modified digital scenes shown in FIGS. 4B and 5B, the lighting estimation system 110 can generate new location-specific-spherical-harmonic coefficients and an adjusted digital scene in response to a position-adjustment request to render a virtual object at a new designated position. Using the local-lighting-estimation-neural network 406 from FIG. 4B, for instance, the lighting estimation system 110 can identify a new local position indicator from a position-adjustment request and modify a global feature map based on the new local position indicator to generate a new masked-dense-feature map. Using the local-lighting-estimation-neural network 504 from FIG. 5B, the lighting estimation system 110 can identify multiple new local position indicators from feature maps output by the first set of network layers 506 and generate a hyper column map from pixels selected from such feature maps.

Using either neural-network architecture from FIG. 4B or 5B, the lighting estimation system 110 can generate a new combined feature map and use a second set of network layers to generate the new location-specific-spherical-harmonic coefficients. Based on the position-adjustment request, the lighting estimation system 110 can thus render an adjusted digital scene comprising the virtual object at the new designated position illuminated according to the new location-specific-spherical-harmonic coefficients. In response to a position-adjustment request, the lighting estimation system 110 can accordingly adapt lighting conditions to different positions to which a computing device moves a virtual object.

In addition to updating location-specific-spherical-harmonic coefficients and digital scenes in response to a position-adjustments, the lighting estimation system 110 can generate new location-specific-spherical-harmonic coefficients and an adjusted scene in response to a change or adjustment in lighting conditions, movement of objects in a scene, or other changes to the scene. Using the first set of network layers 408 from FIG. 4B, for instance, the lighting estimation system 110 can extract a new global feature map from the scene and modify the new global feature map based on a local position indicator to generate a new masked-dense-feature map. Using the first set of network layers 506 from FIG. 5B, the lighting estimation system 110 can generate a new global feature map and generate a new hyper column map from pixels selected from such new global feature maps.

Using either neural-network architecture from FIG. 4B or 5B, the lighting estimation system 110 can generate a new combined feature map and use a second set of network layers to generate the new location-specific-spherical-harmonic coefficients reflecting the adjusted lighting conditions. Based on the adjustment of lighting conditions for the designated position within the digital scene, therefore, the lighting estimation system 110 can render an adjusted digital scene comprising the virtual object at the designated position illuminated according to the new location-specific-spherical-harmonic coefficients. In response to an adjustment to lighting conditions, the lighting estimation system 110 can accordingly adapt location-specific-lighting parameters to reflect the adjustment to lighting conditions.

Figure 6A:
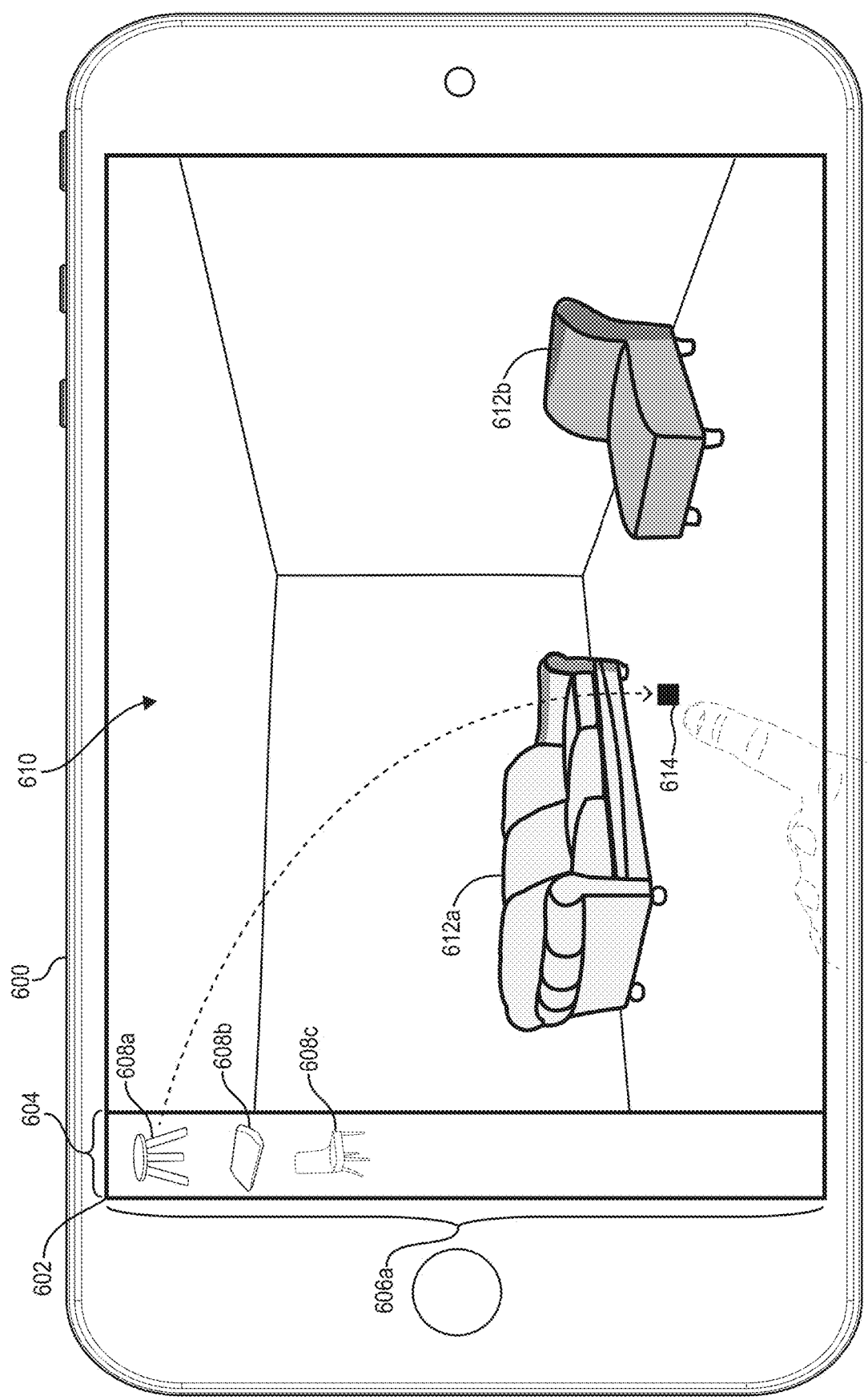
FIGS. 6A-6C illustrate a computing device rendering a digital scene comprising a virtual object at a designated position and a new designated position according to location-specific-lighting parameters and new location-specific-lighting parameters, respectively, in response to different rendering requests in accordance with one or more embodiments.
Figure 6B:
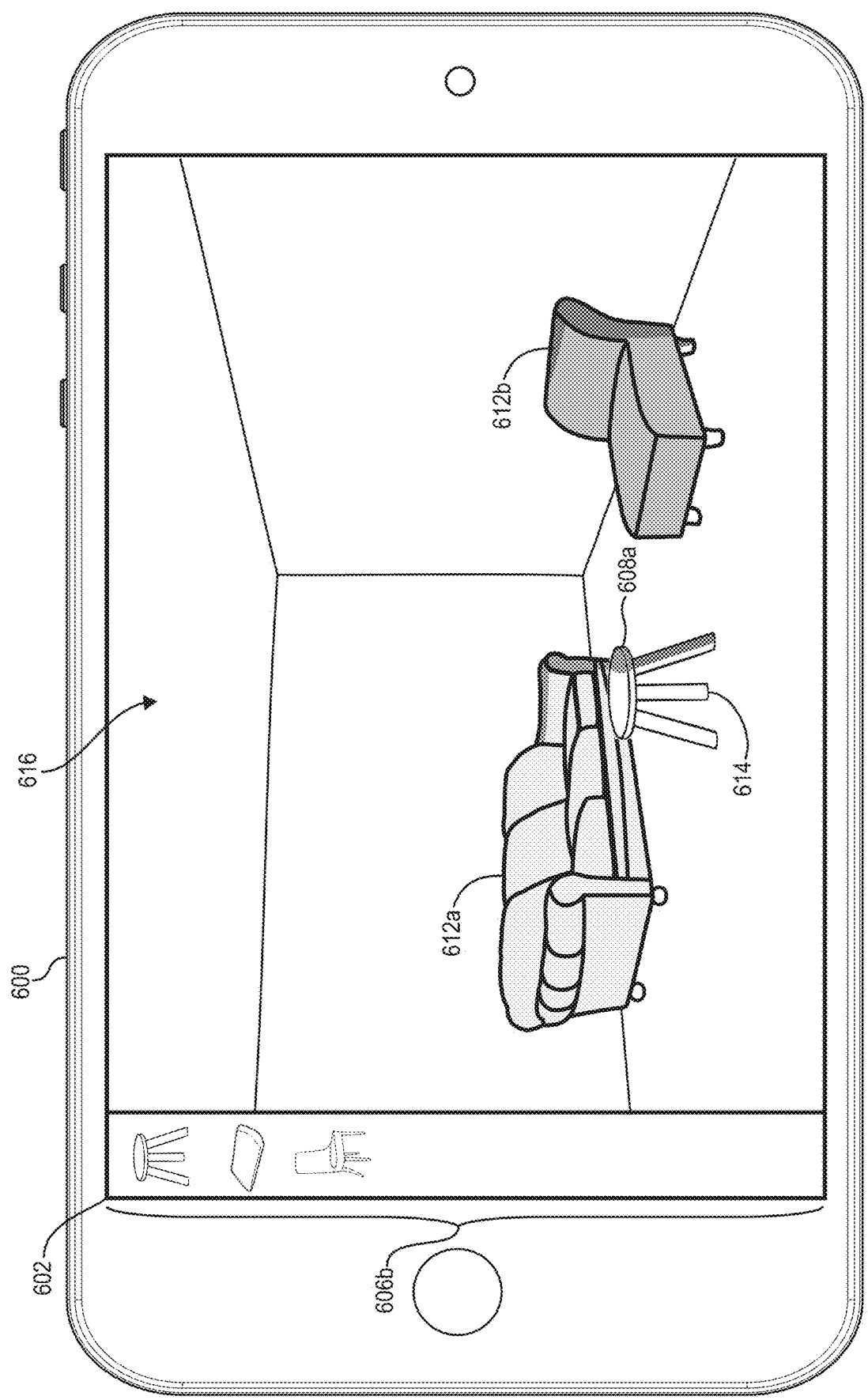
Figure 6C:
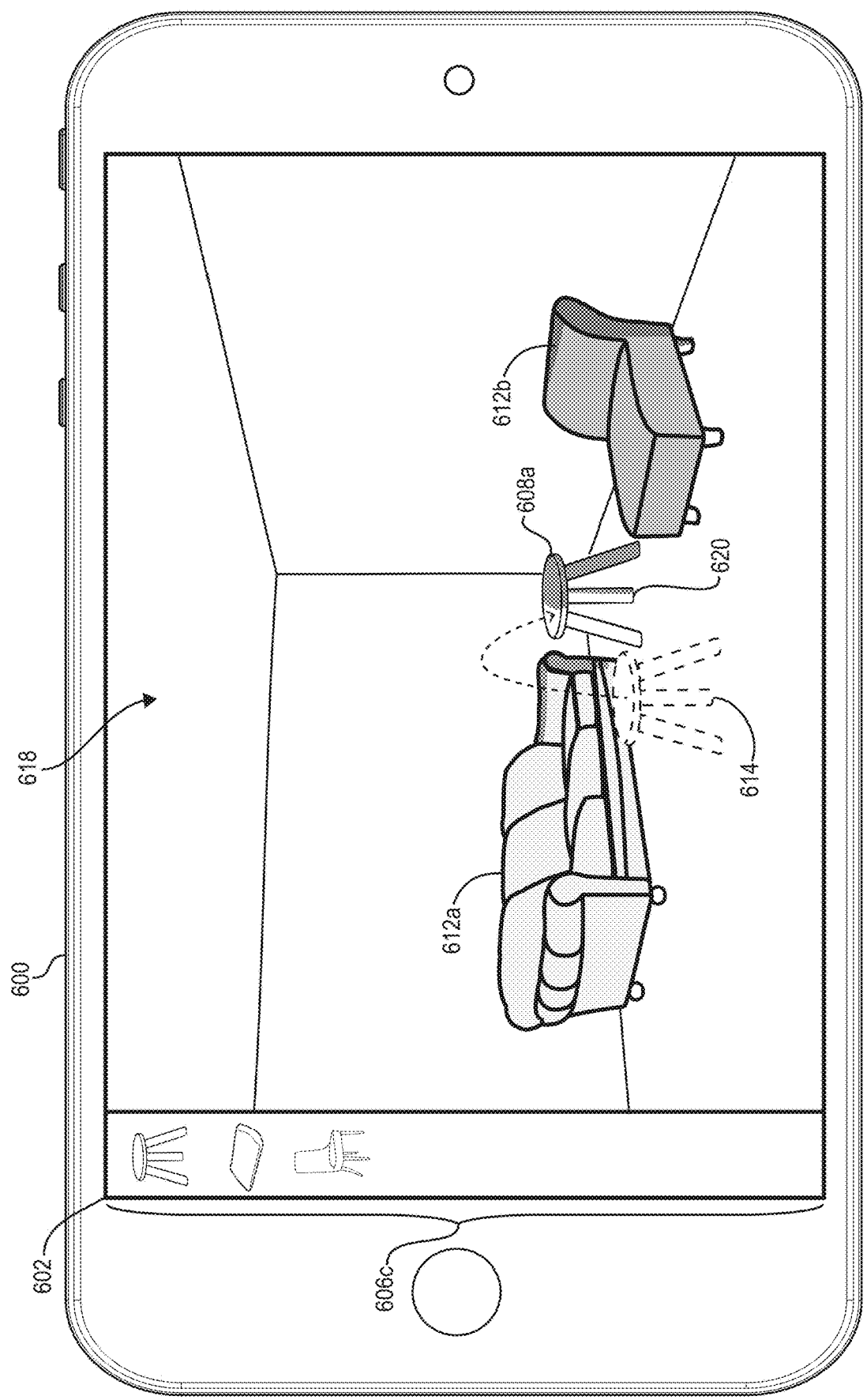

FIGS. 6A-6C depict an embodiment of the lighting estimation system 110 in which a computing device renders a digital scene comprising a virtual object at a designated position and then at a new designated position according to location-specific-lighting parameters and new location-specific-lighting parameters, respectively, in response to different rendering requests. As an overview, FIGS. 6A-6C each depict a computing device 600 comprising an augmented-reality application for the augmented-reality system 108 and the lighting estimation system 110. The augmented-reality application comprises computer-executable instructions that cause the computing device 600 to perform certain actions depicted in FIGS. 6A-6C.

Rather than repeatedly describe the computer-executable instructions within the augmented-reality application as causing the computing device 600 to perform such actions, this disclosure primarily describes the computing device 600 or the lighting estimation system 110 as performing the actions as a shorthand. This disclosure additionally refers to various user interactions indicated by FIGS. 6A-6C, such as when the computing device 600 detects a user selection of a virtual object. While the computing device 600 appears as a mobile device (e.g., smartphone) in FIGS. 6A-6C, the computing device 600 may alternatively be any type of computing device, such as a desktop, laptop, or tablet, and may also detect any suitable user interaction, including, but not limited to, an audio input into a microphone, a gaming-device-button input, a keyboard input, a mouse click, a stylus interaction with a touch screen, or a touch gesture on a touch screen.

Turning back now to FIG. 6A, this figure depicts the computing device 600 presenting a graphical user interface 606a comprising a digital scene 610 within a screen 602. As shown, the digital scene 610 includes real objects 612a and 612b. The graphical user interface 606a further comprises a selectable-option bar 604 for virtual objects 608a-608c. By presenting the graphical user interface 606a, the computing device 600 provides options for a user to request the lighting estimation system 110 to render one or more of the virtual objects 608a-608c at designated positions within the digital scene 610.

As indicated by FIG. 6A, for example, the computing device 600 detects a user interaction requesting that the lighting estimation system 110 render the virtual object 608a at a designated position 614 within the digital scene 610. In particular, FIG. 6A depicts the computing device 600 detecting a drag-and-drop gesture moving the virtual object 608a to the designated position 614. While FIG. 6A illustrates a user using a drag-and-drop gesture, the computing device 600 may detect any suitable user interaction requesting the lighting estimation system 110 to render a virtual object within a digital scene.

Based on receiving the request for the lighting estimation system 110 render the virtual object 608a within the digital scene 610, the augmented-reality system 108 in conjunction with the lighting estimation system 110 render the virtual object 608a at the designated position 614. FIG. 6B depicts an example of such a rendering. As illustrated, the computing device 600 presents a graphical user interface 606b comprising a modified digital scene 616 within the screen 602. Consistent with the disclosure above, the computing device 600 renders the modified digital scene 616 comprising the virtual object 608a at the designated position 614 illuminated according to location-specific-lighting parameters generated by the lighting estimation system 110.

To generate such location-specific-lighting parameters, the lighting estimation system 110 optionally performs the actions illustrated in FIG. 4B or 5B. As shown in rendered form in FIG. 6B, the location-specific-lighting parameters indicate realistic lighting conditions for the virtual object 608a with lighting and shading consistent with the real objects 612a and 612b. The shading for the virtual object 608a and for the real objects 612a and 612b consistently reflect light from a light source outside the perspective shown in the modified digital scene 616.

As noted above, the lighting estimation system 110 can generate new location-specific-lighting parameters and an adjusted digital scene in response to a position-adjustment request to render a virtual object at a new designated position. FIG. 6C depicts an example of such an adjusted digital scene reflecting new location-specific-lighting parameters. As shown in FIG. 6C, the computing device 600 presents a graphical user interface 606c comprising an adjusted digital scene 618 within the screen 602. The computing device 600 detects a user interaction comprising a position-adjustment request to move the virtual object 608a from the designated position 614 to a new designated position 620.

Based on receiving the request for the lighting estimation system 110 to move the virtual object 608a, the augmented-reality system 108 in conjunction with the lighting estimation system 110 render the virtual object 608a at the new designated position 620. Accordingly, FIG. 6C depicts the computing device 600 rendering the adjusted digital scene 618 comprising the virtual object 608a at the new designated position 620 illuminated according to new location-specific-lighting parameters generated by the lighting estimation system 110.

To generate such new location-specific-lighting parameters, the lighting estimation system 110 optionally modifies a global feature map and uses a lighting-estimation-neural network to generate location-specific-spherical-harmonic coefficients as illustrated in FIG. 4B or 5B. As shown in FIG. 6C, the location-specific-lighting parameters indicate realistic lighting conditions for the virtual object 608a with adjusted lighting and shading consistent with the real objects 612a and 612b. As the transition from FIGS. 6B to 6C illustrate, the lighting estimation system 110 can adapt lighting conditions to different positions in real (or near-real) time in response to a position-adjustment request to move a virtual object within a digital scene.

Figure 7A:
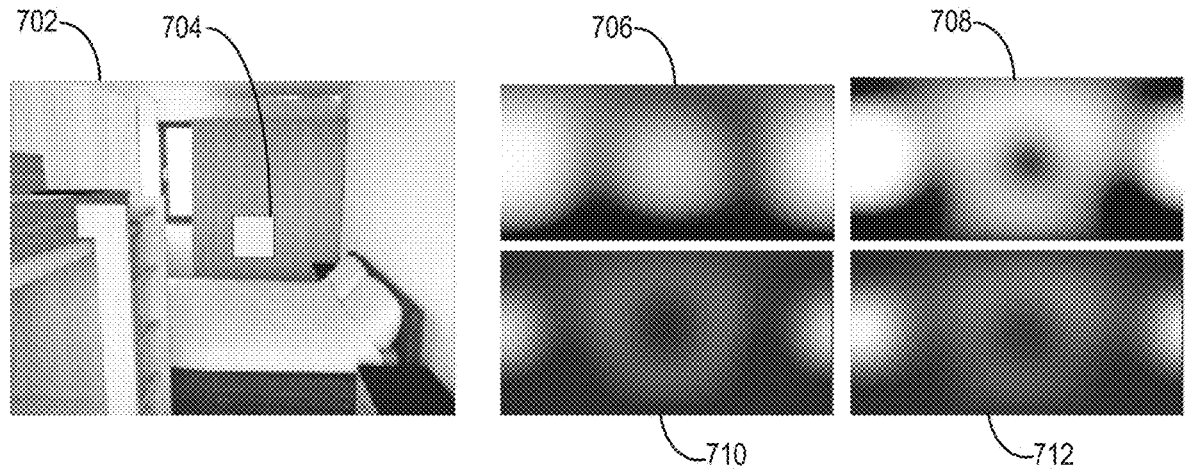
FIG. 7A illustrates a digital scene and corresponding red-green-blue representations and light-intensity representations rendered according to ground-truth-lighting parameters and location-specific-lighting parameters generated by a lighting estimation system in accordance with one or more embodiments.
Figure 7B:
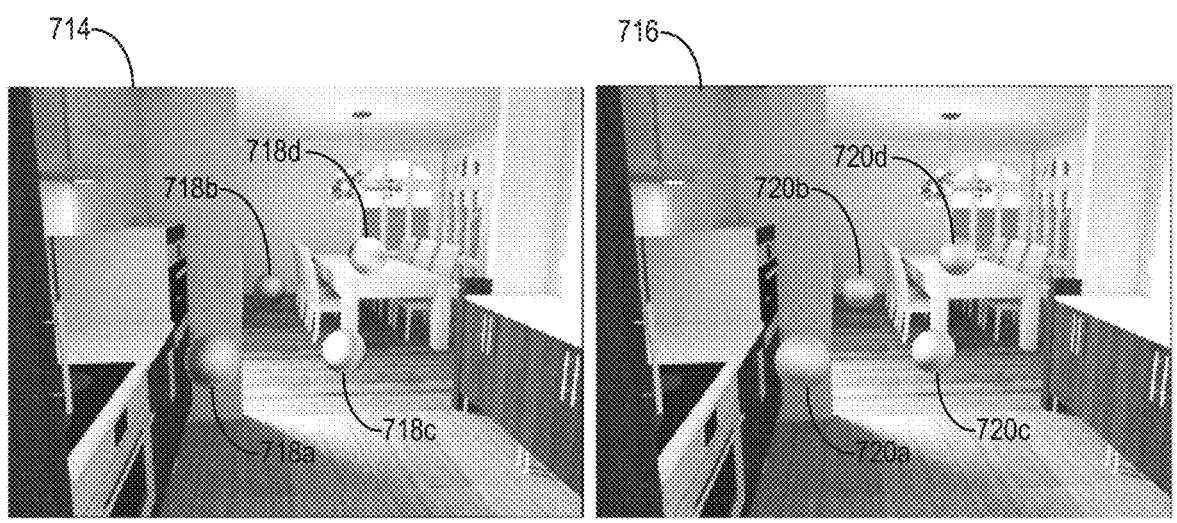
FIG. 7B illustrates a digital scene comprising virtual objects at designated positions illuminated according to ground-truth-lighting parameters and the digital scene comprising the virtual objects at the designated positions illuminated according to location-specific-lighting parameters generated by a lighting estimation system in accordance with one or more embodiments.

As noted above, the lighting estimation system 110 can generate location-specific-lighting parameters that indicate accurate and realistic lighting conditions for positions within a digital scene. To test the accuracy and realism of the lighting estimation system 110, researchers modified digital scenes from the SUNCG dataset (as described above) and applied a local-lighting-estimation-neural network to generate location-specific-lighting parameters for various positions within such digital scenes. FIGS. 7A and 7B illustrate examples of such accuracy and realism in various renderings of digital scenes with positions illuminated according to ground-truth-lighting parameters juxtaposed with positions illuminated according to location-specific-lighting parameters from the lighting estimation system 110.

For both FIGS. 7A and 7B, researchers trained a local-lighting-estimation-neural network as depicted in FIG. 4A—with the local-lighting-estimation-neural network comprising DenseNet Blocks in a first set of network layers from a DenseNet 120 and initialized network parameters using weights trained on an ImageNet. In both FIGS. 7A and 7B, the researchers further generated location-specific-spherical-harmonic coefficients by applying a trained local-lighting-estimation-neural network according to the actions shown in FIG. 4B.

As illustrated by FIG. 7A, for example, the researchers modified a digital scene 702 from the SUNCG dataset. The digital scene 702 includes a designated position 704 indicating a designated position as a target for estimating lighting conditions. For purposes of comparison, the researchers rendered a red-green-blue ("RBG") representation 706 and a light-intensity representation 710 of the designated position according to ground-truth-spherical-harmonic coefficients. Consistent with the disclosure above, the researchers projected the ground-truth-spherical-harmonic coefficients from a cube map for the designated position 704. The researchers further used the lighting estimation system 110 to generate location-specific-spherical-harmonic coefficients for the designated position 704. Upon generating such lighting parameters, the augmented-reality system 108 in conjunction with the lighting estimation system 110 render an RBG representation 708 and a light-intensity representation 712 of the designated position 704 according to the location-specific-spherical-harmonic coefficients.

As indication by the comparison of RGB representations and light-intensity representations shown in FIG. 7A, the lighting estimation system 110 generates location-specific-spherical-harmonic coefficients that accurately and realistically estimate lighting conditions for an object positioned at the designated position 704. Unlike some conventional augmented-reality systems, the lighting estimation system 110 accurately estimates lighting emanating from a light source outside the point of view of the digital scene 702. Despite the most intense lighting source coming from behind a camera capturing the digital scene 702, the lighting estimation system 110 estimates lighting conditions shown in the RBG representation 708 and the light-intensity representation 712 with similar accuracy and realism to those lighting conditions shown in the RBG representation 706 and the light-intensity representation 710 reflecting ground truths.

FIG. 7B illustrates a modified digital scene 714 comprising virtual objects 718a-718d at designated positions illuminated according to ground-truth-spherical-harmonic coefficients. Consistent with the disclosure above, researchers projected the ground-truth-spherical-harmonic coefficients from cube maps for the designated positions within the modified digital scene 714. FIG. 7B further illustrates a modified digital scene 716 comprising virtual objects 720a-720d at the designated positions illuminated according to location-specific-spherical-harmonic coefficients generated by the lighting estimation system 110. To determine estimated lighting conditions for the virtual objects 720a-720d at the designated positions, the lighting estimation system 110 generated location-specific-spherical-harmonic coefficients for each of the designated positions within the modified digital scene 716.

For purposes of comparison, the researchers used the lighting estimation system 110 to render metallic spheres for both the virtual objects 718a-718d in the modified digital scene 714 and the virtual objects 720a-720d in the modified digital scene 716. As shown in FIG. 7B, both the modified digital scene 714 and the modified digital scene 716 include the virtual objects 718a-718d and 720a-720d, respectively, at the same designated positions.

As indicated by a comparison of the lighting for the virtual objects in the modified digital scenes 714 and 716, the lighting estimation system 110 generates location-specific-spherical-harmonic coefficients that accurately and realistically estimate lighting conditions for the virtual objects 720a-720d at each object's respective designated position within the modified digital scene 716. While the light intensities for the virtual objects 720a-720d differ slightly from those of the virtual objects 718a-720d, the trained local-lighting-estimation-neural network detects sufficient geometric context from the underlying scene of the modified digital scene 716 to generate coefficients that both (i) dim the occluded metallic spheres and (ii) reflect a strong directional light on the metallic spheres exposed to light from a light source outside the perspective of the modified digital scene 716.

Figure 8:
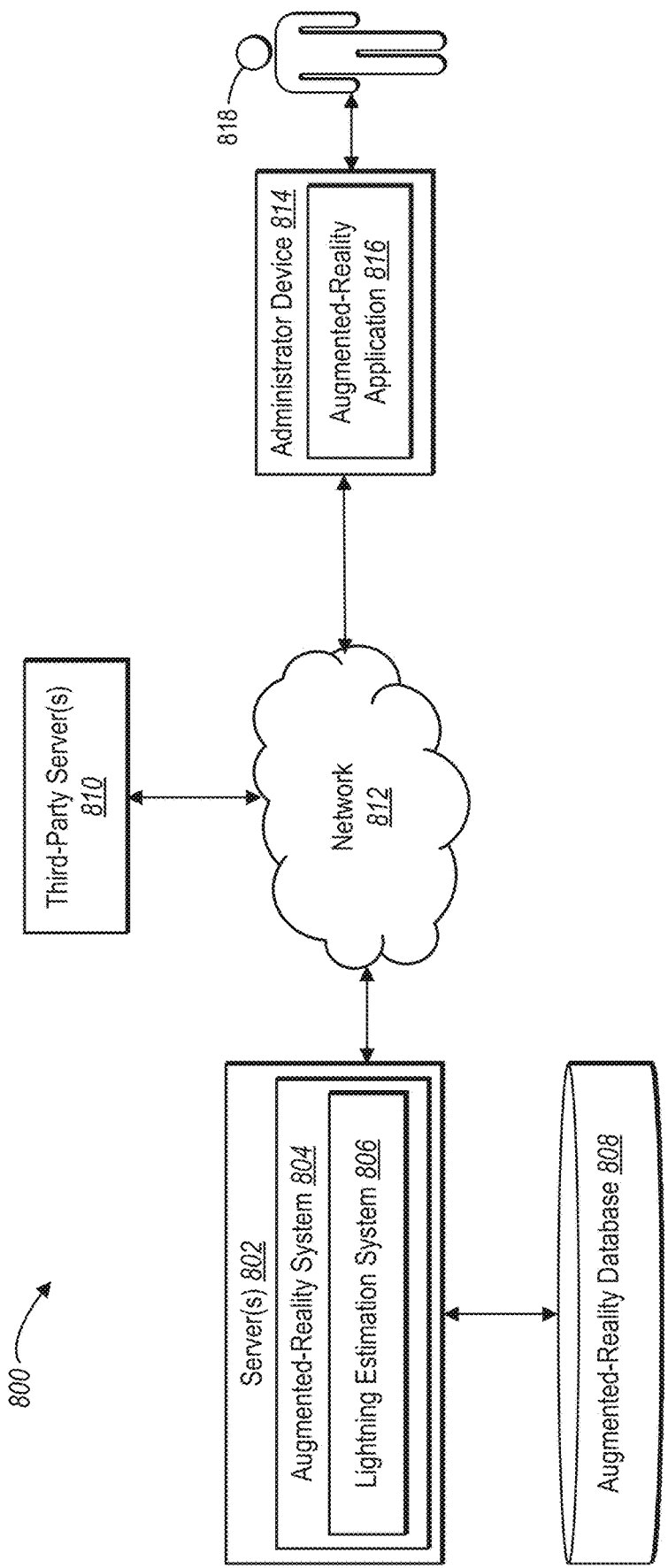
FIG. 8 illustrates a block diagram of an environment in which the lighting estimation system can operate in accordance with one or more embodiments.
Figure 9:
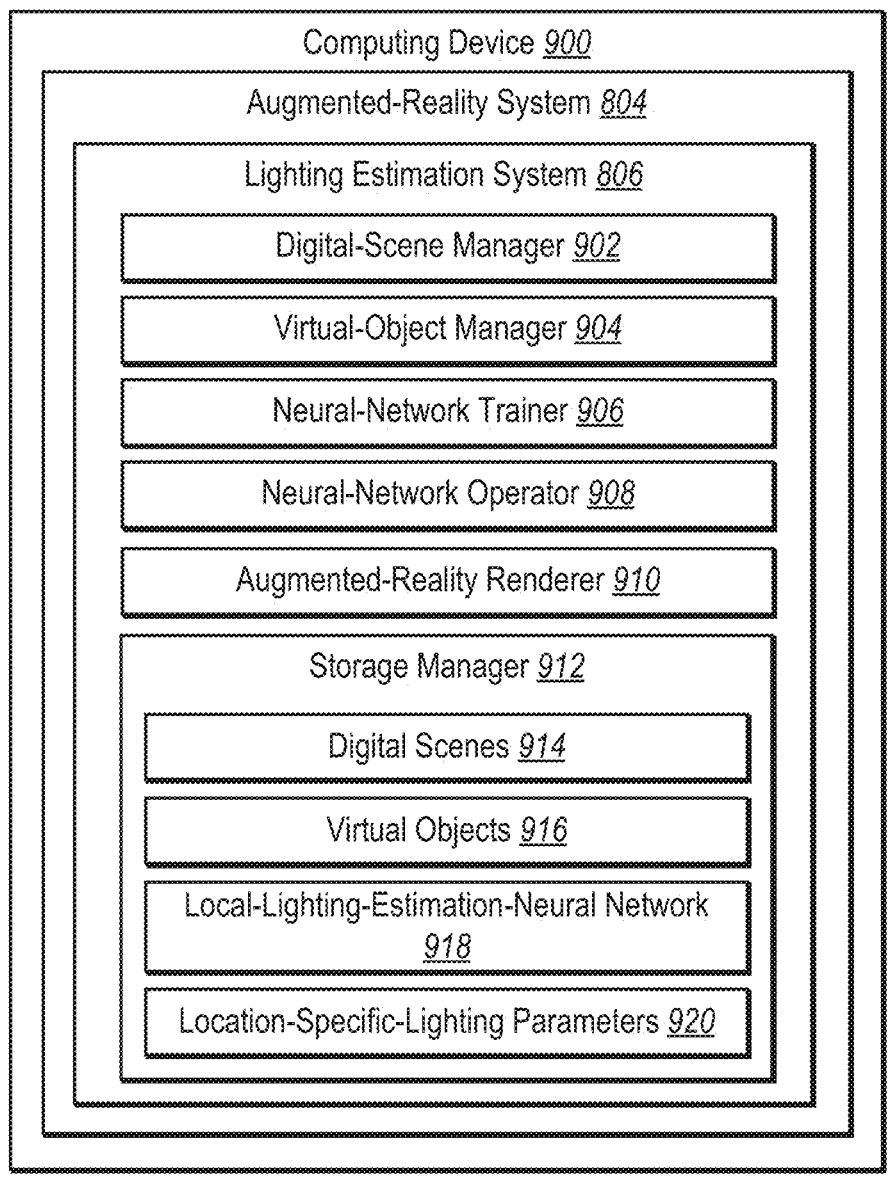
FIG. 9 illustrates a schematic diagram of the lighting estimation system of FIG. 8 in accordance with one or more embodiments.

Turning now to FIGS. 8 and 9, these figures provide an overview of an environment in which a lighting estimation system can operate and an example of an architecture for the lighting estimation system. In particular, FIG. 8 depicts a block diagram illustrating an exemplary system environment ("environment") 800 in which a lighting estimation system 806 can operate in accordance with one or more embodiments. Specifically, FIG. 8 illustrates the environment 800 comprising server(s) 802, third-party server(s) 810, a network 812, a client device 814, and a user 818 associated with the client device 814. Although FIG. 8 illustrates one client device and one user, in alternative embodiments, the environment 800 can include any number of computing devices and associated users. Similarly, although FIG. 8 illustrates a particular arrangement of the server(s) 802, the third-party server(s) 810, the network 812, the client device 814, and the user 818, various additional arrangements are possible.

As shown in FIG. 8, the server(s) 802, the third-party server(s) 810, the network 812, and the client device 814 may be communicatively coupled with each other either directly or indirectly, such as coupling through the network 812, which is described further below in relation to FIG. 12. The server(s) 802 and the client device 814 may include any type of computing device, including one or more computing devices as discussed further below in relation to FIG. 12.

As depicted in FIG. 8, the server(s) 802 can generate, store, receive, and/or transmit any type of data, including inputs of digital scenes into neural networks or user inputs requesting a rendering of a virtual object to create an augmented-reality scene. For example, the server(s) 802 can receive a user input from the client device 814 requesting to render a virtual object at a designated position within a digital scene and then utilize a local-lighting-estimation-neural network to generate location-specific-lighting parameters for the designated position. Upon generating such parameters, the server(s) 802 can further render a modified digital scene comprising the virtual object at the designated position illuminated according to the location-specific-lighting parameters. In some embodiments, the server(s) 802 comprise a data server, a communication server, or a web-hosting server.

As further shown in FIG. 8, the server(s) 802 can include an augmented-reality system 804. In general, the augmented-reality system 804 facilitates the generation, modification, sharing, accessing, storing, and/or deletion of digital content in augmented-reality-based imagery (e.g., two-dimensional-digital image of a scene or three-dimensional-digital model of a scene). For example, the augmented-reality system 804 can use the server(s) 802 to generate modified digital images or models comprising virtual objects or modify existing digital scenes. In certain implementations, the augmented-reality system 804 uses the server(s) 802 to receive user inputs identifying digital scenes, virtual objects, or designated positions within digital scenes from the client device 814 or transmit data representing digital scenes, virtual objects, or designated positions to the client device 814.

In addition to the augmented-reality system 804, the server(s) 802 include the lighting estimation system 806. The lighting estimation system 806 is an embodiment (and can perform the functions, methods, and processes) of the lighting estimation system 110 described above. In some embodiments, for example, the lighting estimation system 806 uses the server(s) 802 to identify a request to render a virtual object at a designated position within a digital scene. The lighting estimation system 806 further uses the server(s)

802 to extract a global feature map from the digital scene using a first set of network layers of a local-lighting-estimation-neural network. In certain implementations, the lighting estimation system 806 further uses the server(s) 802 to generate a local position indicator for the designated position and modify the global feature map for the digital scene based on the local position indicator. Based on the modified global feature map, the lighting estimation system 806 further uses the server(s) 802 to (i) generate location-specific-lighting parameters for the designated position using a second set of layers of the local-lighting-estimation-neural network and (ii) render a modified digital scene comprising the virtual object at the designated position illuminated according to the location-specific-lighting parameters.

As suggested by previous embodiments, the lighting estimation system 806 can be implemented in whole or in part by the individual elements of the environment 800. Although FIG. 8 illustrates the lighting estimation system 806 implemented within the server(s) 802, components of the lighting estimation system 806 can be implemented in other components of the environment 800. For instance, in some embodiments, the client device 814 comprises the lighting estimation system 806 and performs all of the functions, methods, and processes of the lighting estimation system 806 described above and below. This disclosure describes the components of the lighting estimation system 806 further below with regard to FIG. 9.

As further shown in FIG. 8, in some embodiments, the client device 814 comprises a computing device that allows the user 818 to send and receive digital communications. For example, the client device 814 can include a desktop computer, laptop computer, smartphone, tablet, or other electronic device. In some embodiments, the client device 814 further includes one or more software applications (e.g., an augmented-reality application 816) that allows a user 818 to send and receive digital communications. For example, the augmented-reality application 816 can be a software application installed on the client device 814 or a software application hosted on the server(s) 802. When hosted on the server(s) 802, the augmented-reality application 816 may be accessed by the client device 814 through another application, such as a web browser. In some implementations, the augmented-reality application 816 includes instructions that, when executed by a processor, cause the client device 814 to present one or more graphical user interfaces, such as user interfaces comprising digital scenes and/or virtual objects for the user 818 to select and for the lighting estimation system 806 to include as inputs when generating location-specific-lighting parameters or modified digital scenes.

As also illustrated in FIG. 8, the augmented-reality system 804 is communicatively coupled to the augmented-reality database 808. In one or more embodiments, the augmented-reality system 804 accesses and queries data from the augmented-reality database 808 associated with requests from the lighting estimation system 806. For instance, the augmented-reality system 804 may access digital scenes, virtual objects, designated positions within digital scenes, or location-specific-lighting parameters for the lighting estimation system 806. As shown in FIG. 8, the augmented-reality database 808 is separately maintained from the server(s) 802. Alternatively, in one or more embodiments, the augmented-reality system 804 and the augmented-reality database 808 comprise a single combined system or subsystem within the server(s) 802.

Turning now to FIG. 9, this figure provides additional detail regarding components and features of the lighting estimation system 806. In particular, FIG. 9 illustrates a computing device 900 implementing the augmented-reality system 804 and the lighting estimation system 806. In some embodiments, the computing device 900 comprises one or more servers (e.g., the server(s) 802). In other embodiments, the computing device 900 comprises one or more client devices (e.g., the client device 814).

As shown in FIG. 9, the computing device 900 includes the augmented-reality system 804. In some embodiments, the augmented-reality system 804 uses its components to provide tools for generating digital scenes or other augmented-reality-based imagery or modifying existing digital scenes or other augmented-reality-based imagery within a user interface of the augmented-reality application 816. Additionally, in some cases, the augmented-reality system 804 facilitates the generation, modification, sharing, accessing, storing, and/or deletion of digital content in augmented-reality-based imagery.

As further shown in FIG. 9, the computing device 900 includes the lighting estimation system 806. The lighting estimation system 806 includes, but is not limited to, a digital-scene manager 902, a virtual-object manager 904, a neural-network trainer 906, a neural-network operator 908, an augmented-reality renderer 910, and/or a storage manager 912. The following paragraphs describe each of these components in turn.

As just mentioned, the lighting estimation system 806 includes the digital-scene manager 902. The digital-scene manager 902 receives inputs concerning, identifies, and analyzes digital scenes. For example, in some embodiments, the digital-scene manager 902 receives user inputs identifying digital scenes and presents digital scenes from an augmented-reality application. Additionally, in some embodiments, the digital-scene manager 902 identifies multiple digital scenes for presentation as part of a sequence of images (e.g., an augmented-reality sequence).

As further shown in FIG. 9, the virtual-object manager 904 receives inputs concerning, identifies, and analyzes virtual objects. For example, in some embodiments, the virtual-object manager 904 receives user inputs identifying virtual objects and requesting that the lighting estimation system 110 render virtual objects at designated locations within digital scenes. Additionally, in some embodiments, the virtual-object manager 904 provides selectable options for virtual objects, such as selectable options shown in a user interface of an augmented-reality application.

As further shown in FIG. 9, the neural-network trainer 906 trains a local-lighting-estimation-neural network 918. For example, in some embodiments, the neural-network trainer 906 extracts a global-feature-training map from a digital training scene using a first set of layers of the local-lighting-estimation-neural network 918. Additionally, in some embodiments, the neural-network trainer 906 generates a local-position-training indicator for a designated position within the digital training scene and modifies the global-feature-training map based on the local-position-training indicator for the designated position. From the modified global-feature-training map, the neural-network trainer 906 (i) generates location-specific-lighting-training parameters for the designated position using a second set of network layers of the local-lighting-estimation-neural network 918 and (ii) modifies network parameters of the local-lighting-estimation-neural network based on a comparison of the location-specific-lighting-training parameters with ground-truth-lighting parameters for the designated position within the digital training scene.

In some such embodiments, the neural-network trainer 906 trains the local-lighting-estimation-neural network 918 as illustrated in FIGS. 4A and 5A, respectively. In some embodiments, the neural-network trainer 906 further communicates with the storage manager 912 to apply and/or access digital training scenes from digital scenes 914, ground-truth-lighting parameters from location-specific-lighting parameters 920, and/or the local-lighting-estimation-neural network 918.

As further shown in FIG. 9, the neural-network operator 908 applies a trained version of the local-lighting-estimation-neural network 918. For example, in some embodiments, the neural-network operator 908 extracts a global feature map from a digital scene using a first set of network layers of the local-lighting-estimation-neural network 918. The neural-network operator 908 further generates a local position indicator for the designated position and modifies the global feature map for the digital scene based on the local position indicator. Based on the modified global feature map, the neural-network operator 908 further generates location-specific-lighting parameters for the designated position using a second set of layers of the local-lighting-estimation-neural network. In some such embodiments, the neural-network operator 908 applies the local-lighting-estimation-neural network 918 as illustrated in FIGS. 4B and 5B, respectively. In some embodiments, the neural-network operator 908 further communicates with the storage manager 912 to apply and/or access digital scenes from the digital scenes 914, virtual objects from virtual objects 916, location-specific-lighting parameters from location-specific-lighting parameters 920, and/or the local-lighting-estimation-neural network 918.

In addition to the neural-network operator 908, in some embodiments, the lighting estimation system 806 further comprises the augmented-reality renderer 910. The augmented-reality renderer 910 renders modified digital scenes comprising virtual objects. For example, in some embodiments, based on a request to render a virtual object at a designated position within a digital scene, the augmented-reality renderer 910 renders a modified digital scene comprising the virtual object at the designated position illuminated according to location-specific-lighting parameters from the neural-network operator 908.

In one or more embodiments, each of the components of the lighting estimation system 806 are in communication with one another using any suitable communication technologies. Additionally, the components of the lighting estimation system 806 can be in communication with one or more other devices including one or more client devices described above. Although the components of the lighting estimation system 806 are shown to be separate in FIG. 9, any of the subcomponents may be combined into fewer components, such as into a single component, or divided into more components as may serve a particular implementation. Furthermore, although the components of FIG. 9 are described in connection with the lighting estimation system 806, at least some of the components for performing operations in conjunction with the lighting estimation system 806 described herein may be implemented on other devices within the environment 800.

Each of the components 902-920 of the lighting estimation system 806 can include software, hardware, or both. For example, the components 902-920 can include one or more instructions stored on a computer-readable storage medium and executable by processors of one or more computing devices, such as a client device or server device. When executed by the one or more processors, the computer-executable instructions of the lighting estimation system 806 can cause the computing device(s) to perform the methods described herein. Alternatively, the components 902-920 can include hardware, such as a special-purpose processing device to perform a certain function or group of functions. Alternatively, the components 902-920 of the lighting estimation system 806 can include a combination of computer-executable instructions and hardware.

Furthermore, the components 902-920 of the lighting estimation system 806 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 902-920 may be implemented as a stand-alone application, such as a desktop or mobile application. Furthermore, the components 902-920 may be implemented as one or more web-based applications hosted on a remote server. The components 902-920 may also be implemented in a suite of mobile device applications or "apps." To illustrate, the components 902-920 may be implemented in a software application, including, but not limited to, ADOBE ILLUSTRATOR, ADOBE EXPERIENCE DESIGN, ADOBE CREATIVE CLOUD, ADOBE PHOTOSHOP, PROJECT AERO, or ADOBE LIGHTROOM. "ADOBE," "ILLUSTRATOR," "EXPERIENCE DESIGN," "CREATIVE CLOUD," "PHOTOSHOP," "PROJECT AERO," and "LIGHTROOM" are either registered trademarks or trademarks of Adobe Inc. in the United States and/or other countries.

Figure 10:
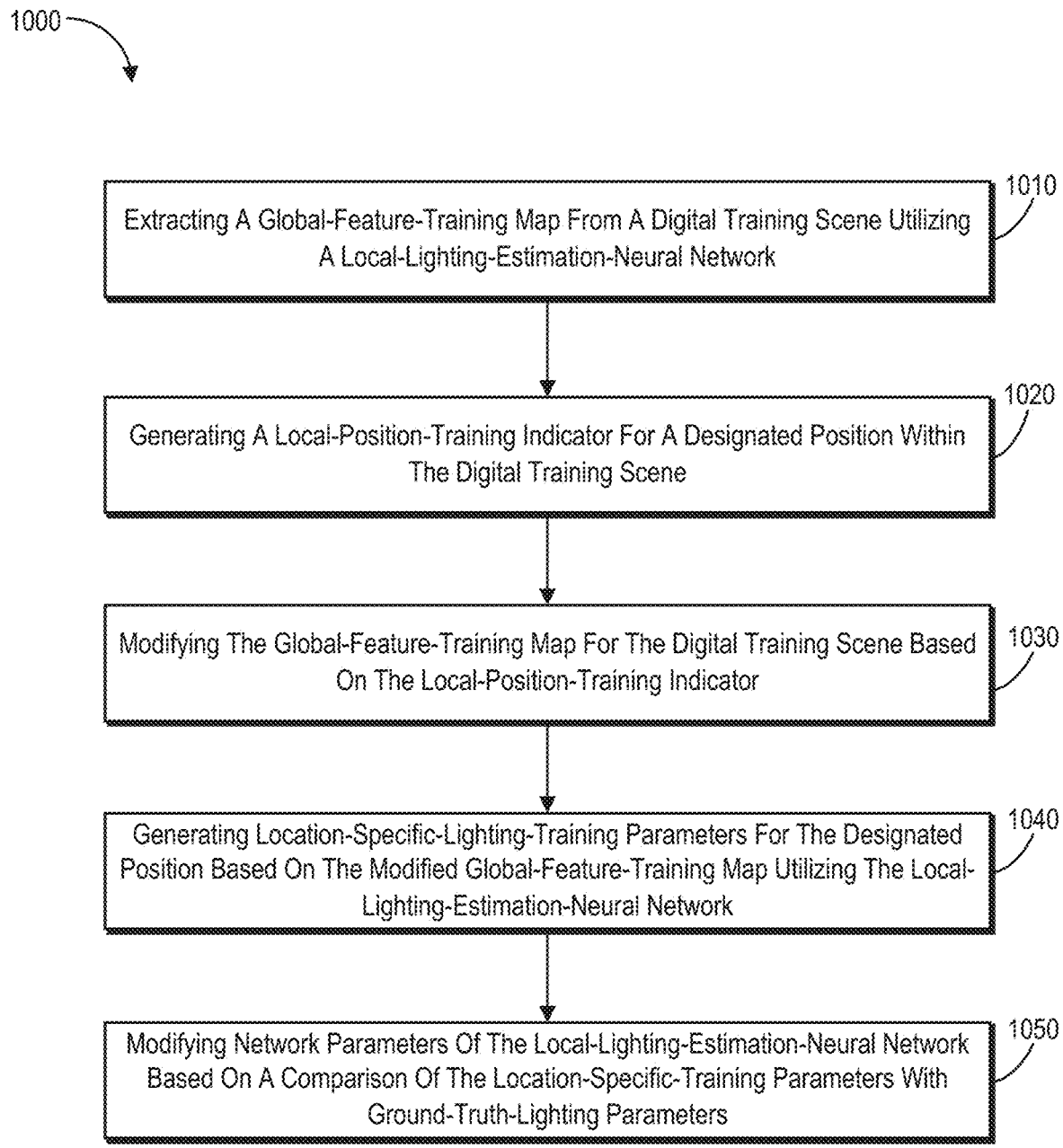
FIG. 10 illustrates a flowchart of a series of acts for training a local-lighting-estimation-neural network to generate location-specific-lighting parameters in accordance with one or more embodiments.

Turning now to FIG. 10, this figure illustrates a flowchart of a series of acts 1000 of training a local-lighting-estimation-neural network to generate location-specific-lighting parameters in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system can perform the acts of FIG. 10.

As shown in FIG. 10, the acts 1000 include an act 1010 of extracting a global-feature-training map from a digital training scene utilizing a local-lighting-estimation-neural network. In particular, in some embodiments, the act 1010 includes extracting a global-feature-training map from a digital training scene of the digital training scenes utilizing a first set of network layers of a local-lighting-estimation-neural network. In some embodiments, the digital training scene comprises a three-dimensional-digital model or a digital viewpoint image of a realistic scene.

As further shown in FIG. 10, the acts 1000 include an act 1020 of generating a local-position-training indicator for a designated position within the digital training scene. For example, in certain embodiments, generating the local-position-training indicator comprises identifying local-position-training coordinates representing the designated position within the digital training scene. By contrast, in some implementations, generating the local-position-training indicator comprises selecting a first training pixel corresponding to the designated position from a first feature-training map corresponding to a first layer of the local-lighting-estimation-neural network; and selecting a second training pixel corresponding to the designated position from a second feature-training map corresponding to a second layer of the local-lighting-estimation-neural network.

As further shown in FIG. 10, the acts 1000 include an act 1030 of modifying the global-feature-training map for the digital training scene based on the local-position-training indicator. For example, in certain implementations, the act 1030 includes modifying the global-feature-training map to generate the modified global-feature-training map by: generating a masking-feature-training map from the local-position-training coordinates; multiplying the global-feature-training map and the masking-feature-training map for the local-position-training coordinates to generate a masked-dense-feature-training map; and concatenating the global-feature-training map and the masked-dense-feature-training map to form a combined-feature-training map.

As further shown in FIG. 10, the acts 1000 include an act 1040 of generating location-specific-lighting-training parameters for the designated position based on the modified global-feature-training map utilizing the local-lighting-estimation-neural network. In particular, in certain implementations, the act 1040 includes generating location-specific-lighting-training parameters for the designated position based on the modified global-feature-training map utilizing a second set of network layers of the local-lighting-estimation-neural network. In some embodiments, the first set of network layers of the local-lighting-estimation-neural network comprises lower layers of a densely connected convolutional network and the second set of network layers of the local-lighting-estimation-neural network comprises convolutional layers and fully connected layers.

As suggested above, in certain implementations, generating the location-specific-lighting-training parameters for the designated position comprises generating location-specific-spherical-harmonic-training coefficients indicating lighting conditions at the designated position. In some such embodiments, generating the location-specific-spherical-harmonic-training coefficients comprises generating the location-specific-spherical-harmonic-training coefficients of degree five for each color channel.

As further shown in FIG. 10, the acts 1000 include an act 1050 of modifying network parameters of the local-lighting-estimation-neural network based on a comparison of the location-specific-training parameters with ground-truth-lighting parameters. In particular, in certain implementations, the act 1050 includes modifying network parameters of the local-lighting-estimation-neural network based on a comparison of the location-specific-lighting-training parameters with a set of ground-truth-lighting parameters for the designated position within the digital training scene.

In addition to the acts 1010-1050, in some cases, the acts 1000 further include determining the set of ground-truth-lighting parameters for the designated position by determining a set of ground-truth-location-specific-spherical-harmonic coefficients indicating lighting conditions at the designated position. Additionally, in one or more embodiments, the acts 1000 further include generating the location-specific-lighting-training parameters by providing the combined-feature-training map to the second set of network layers.

As suggested above, in some embodiments, the acts 1000 further include determining the set of ground-truth-lighting parameters for the designated position by determining a set of ground-truth-location-specific-spherical-harmonic coefficients indicating lighting conditions at the designated position. In some such implementations, determining the set of ground-truth-location-specific-spherical-harmonic coefficients comprises: identifying positions within the digital training scene; generating a cube map for each position within the digital training scene; and projecting the cube map for each position within the digital training scene to the set of ground-truth-location-specific-spherical-harmonic coefficients.

Figure 11:
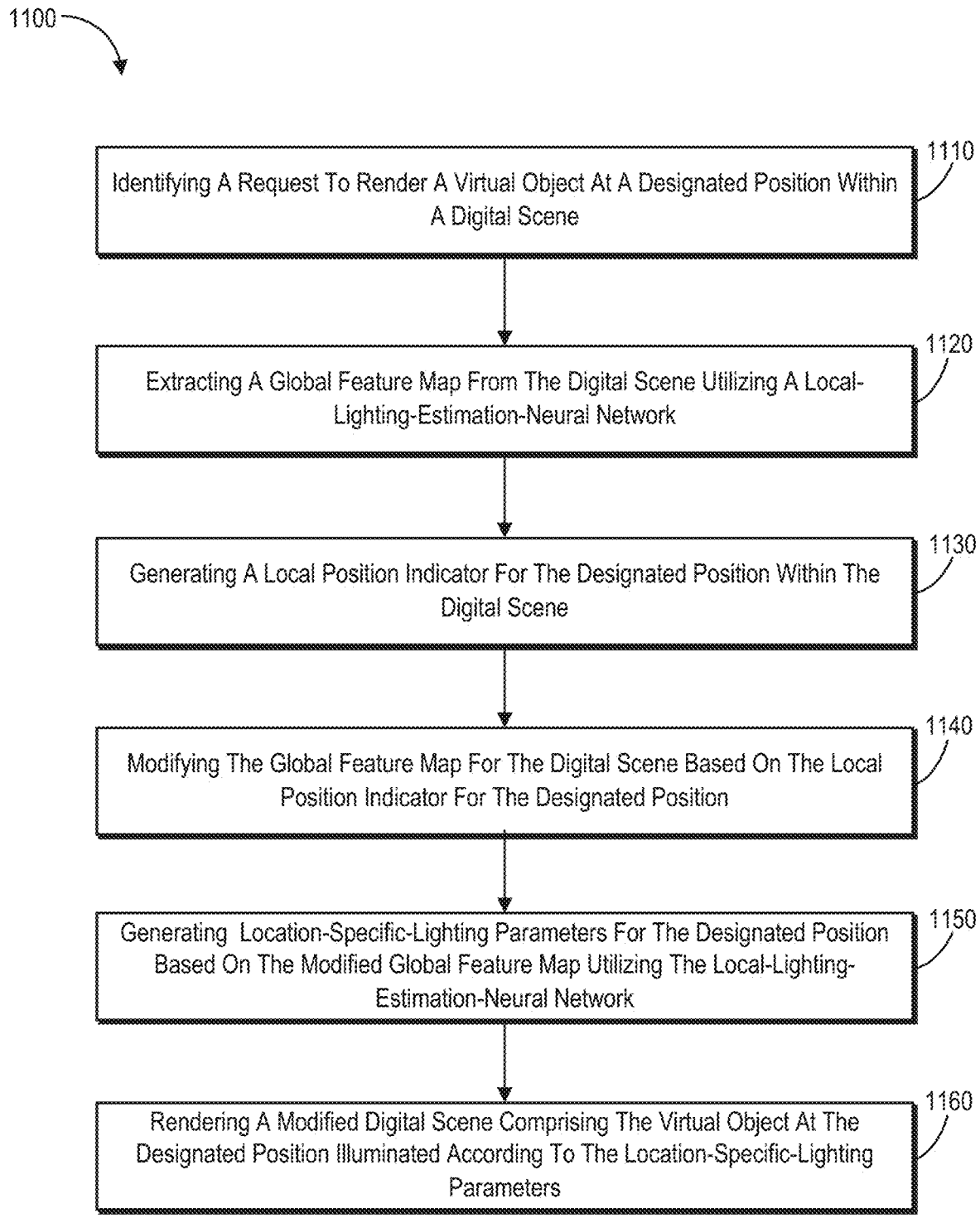
FIG. 11 illustrates a flowchart of a series of acts for applying a trained local-lighting-estimation-neural network to generate location-specific-lighting parameters in accordance with one or more embodiments.

Turning now to FIG. 11, this figure illustrates a flowchart of a series of acts 1100 of applying a trained local-lighting-estimation-neural network to generate location-specific-lighting parameters in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable storage medium can comprise instructions that, when executed by one or more processors, cause a computing device to perform the acts depicted in FIG. 11. In still further embodiments, a system can perform the acts of FIG. 11.

As shown in FIG. 11, the acts 1100 include an act 1110 of identifying a request to render a virtual object at a designated position within a digital scene. For example, in some embodiments, identifying the request comprises receiving the request to render the virtual object at the designated position from a mobile device.

As further shown in FIG. 11, the acts 1100 include an act 1120 of extracting a global feature map from the digital scene utilizing a local-lighting-estimation-neural network. In particular, in some embodiments, the act 1120 includes extracting a global feature map from the digital scene utilizing a first set of network layers of a local-lighting-estimation-neural network.

As further shown in FIG. 11, the acts 1100 include an act 1130 of generating a local position indicator for the designated position within the digital scene. In particular, in some embodiments, the act 1130 includes generating the local position indicator for the designated position by identifying local position coordinates representing the designated position within the digital scene.

By contrast, in certain implementations, the act 1130 includes generating the local position indicator for the designated position by selecting a first pixel corresponding to the designated position from a first feature map corresponding to a first layer of the first set of network layers; and selecting a second pixel corresponding to the designated position from a second feature map corresponding to a second layer of the first set of network layers.

As further shown in FIG. 11, the acts 1100 include an act 1140 of modifying the global feature map for the digital scene based on the local position indicator for the designated position. In particular, in some embodiments, the act 1140 includes modifying the global feature map to generate the modified global feature map by: combining features for the first pixel and the second pixel corresponding to the designated position to generate a hyper column map; and concatenating the global feature map and the hyper column map to form a combined feature map.

As further shown in FIG. 11, the acts 1100 include an act 1150 of generating location-specific-lighting parameters for the designated position based on the modified global feature map utilizing the local-lighting-estimation-neural network. In particular, in some embodiments, the act 1140 includes, generating location-specific-lighting parameters for the designated position based on the modified global feature map utilizing a second set of network layers of the local-lighting-estimation-neural network. In some embodiments, the first set of network layers of the local-lighting-estimation-neural network comprises lower layers of a densely connected convolutional network and the second set of network layers of the local-lighting-estimation-neural network comprises convolutional layers and fully connected layers.

As an example of the act 1150, in some embodiments, generating the location-specific-lighting parameters for the designated position comprises generating location-specific-spherical-harmonic coefficients indicating lighting conditions for an object at the designated position. As a further example, in certain implementations, generating the location-specific-lighting parameters comprises providing the combined feature map to the second set of network layers.

As further shown in FIG. 11, the acts 1100 include an act 1160 of rendering a modified digital scene comprising the virtual object at the designated position illuminated according to the location-specific-lighting parameters. In particular, in some embodiments, the act 1160 includes, based on the request, rendering the modified digital scene comprising the virtual object at the designated position illuminated according to the location-specific-lighting parameters. For example, in some cases, rendering the modified digital scene comprises, based on receiving the request from the mobile device, rendering, within a graphical user interface of the mobile device, the modified digital scene comprising the virtual object at the designated position illuminated according to the location-specific-lighting parameters.

In addition to the acts 1110-1160, in certain implementations, the acts 1100 further include identifying a position-adjustment request to move the virtual object from the designated position within the digital scene to a new designated position within the digital scene; generating a new local position indicator for the new designated position within the digital scene; modifying the global feature map for the digital scene based on the new local position indicator for the new designated position to form a new modified global feature map; generating new location-specific-lighting parameters for the new designated position based on the new modified global feature map utilizing the second set of network layers; and based on the position-adjustment request, rendering an adjusted digital scene comprising the virtual object at the new designated position illuminated according to the new location-specific-lighting parameters.

As suggested above, in one or more embodiments, the acts 1100 further include identifying a perspective-adjustment request to render the digital scene from a different point of view; and based on the perspective-adjustment request, rendering the modified digital scene from the different point of view comprising the virtual object at the designated position illuminated according to the location-specific-lighting parameters.

Further, in some cases, the acts 1100 further include identifying a perspective-adjustment request to render the virtual object at the designated position within the digital scene from a different point of view; generating a new local position indicator for the designated position within the digital scene from the different point of view; modifying the global feature map for the digital scene based on the new local position indicator for the designated position from the different point of view to form a new modified global feature map; generating new location-specific-lighting parameters for the designated position from the different point of view based on the new modified global feature map utilizing the second set of network layers; and based on the adjustment of lighting conditions, render an adjusted digital scene comprising the virtual object at the designated position illuminated according to the new location-specific-lighting parameters.

Additionally, in certain implementations, the acts 1100 further include identifying an adjustment of lighting conditions for the designated position within the digital scene; extracting a new global feature map from the digital scene utilizing the first set of network layers of the local-lighting-estimation-neural network; modifying the new global feature map for the digital scene based on the local position indicator for the designated position; generating new location-specific-lighting parameters for the designated position based on the new modified global feature utilizing the second set of networking layers; and based on the adjustment of lighting conditions, render an adjusted digital scene comprising the virtual object at the designated position illuminated according to the new location-specific-lighting parameters.

In addition (or in the alternative) to the acts describe above, in some embodiments, the acts 1000 (or the acts 1100) include a step for training a local-lighting-estimation-neural network utilizing global-feature-training maps for the digital training scenes and local-position-training indicators for designated positions within the digital training scenes. For instance, the algorithms and acts described in reference to FIG. 4A or FIG. 5A can comprise the corresponding acts for performing a step for training a local-lighting-estimation-neural network utilizing global-feature-training maps for the digital training scenes and local-position-training indicators for designated positions within the digital training scenes.

Additionally, or alternatively, in some embodiments, the acts 1000 (or the acts 1100) include a step for generating location-specific-lighting parameters for the designated position by utilizing the trained local-lighting-estimation-neural network. For instance, the algorithms and acts described in reference to FIG. 4B or FIG. 5B can comprise the corresponding acts for performing a step for generating location-specific-lighting parameters for the designated position by utilizing the trained local-lighting-estimation-neural network.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 12:
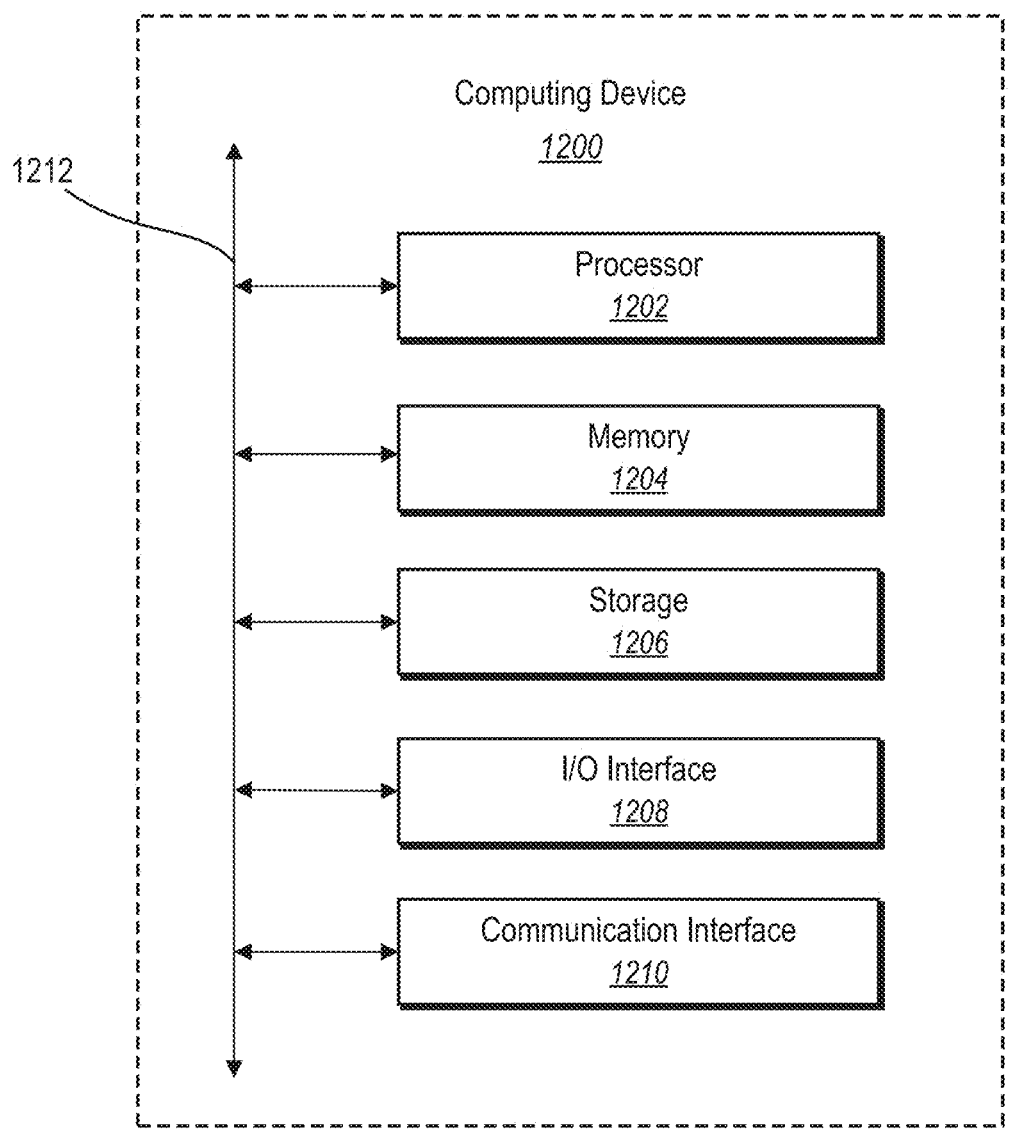
FIG. 12 illustrates a block diagram of an exemplary computing device for implementing one or more embodiments of the present disclosure.

FIG. 12 illustrates a block diagram of exemplary computing device 1200 that may be configured to perform one or more of the processes described above. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for digitizing real-world objects, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions related to object digitizing processes (e.g., digital scans, digital models).

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers.

In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computing device to:
    identify a request to render an object at a designated position within a digital scene;
    generate global features for the digital scene utilizing a neural network;
    generate local features for the designated position within the digital scene;
    generate, utilizing the neural network, location-specific-lighting parameters for the designated position from the global features and the local features; and
    render a modified digital scene comprising the object at the designated position illuminated according to the location-specific-lighting parameters.

2. The non-transitory computer readable medium of claim 1, wherein the instructions, when executed by the at least one processor, cause the computing device to generate the global features by extracting a global feature map from the digital scene utilizing a first set of layers of the neural network.

3. The non-transitory computer readable medium of claim 2, wherein the instructions, when executed by the at least one processor, cause the computing device to generate the location-specific-lighting parameters by concatenating the global feature map and the local features and processing the concatenation of the global feature map and the local features utilizing a second set of layers of the neural network.

4. The non-transitory computer readable medium of claim 1, wherein the instructions, when executed by the at least one processor, cause the computing device to generate the local features by masking the global features based on the designated position.

5. The non-transitory computer readable medium of claim 4, wherein the instructions, when executed by the at least one processor, cause the computing device to generate the location-specific-lighting parameters for the designated position by concatenating the global features and the masked global features and regressing the location-specific-lighting parameters from the concatenation of the global features and the masked global features utilizing the neural network.

6. The non-transitory computer readable medium of claim 4, wherein masking the global features based on the designated position comprises multiplying the global features by a one-hot-vector having a value of one set at the designated position.

7. The non-transitory computer readable medium of claim 1, wherein the instructions, when executed by the at least one processor, cause the computing device to generate the local features by generating a hyper column of features by extracting values corresponding to the designated position from feature maps from layers of the neural network used to generate the global features.

8. The non-transitory computer readable medium of claim 7, wherein the instructions, when executed by the at least one processor, cause the computing device to generate the location-specific-lighting parameters for the designated position by concatenating the global features with the hyper column of features and regressing the location-specific-lighting parameters from the concatenation of the global features and the hyper column of features utilizing the neural network.

9. The non-transitory computer readable medium of claim 1, further comprising instruction, that when executed by the at least one processor, cause the computing device to dynamically update the location-specific-lighting parameters and dynamically render modified digital scenes based on updated location-specific-lighting parameters as a perspective of the digital scene moves due to movement of a camera of the computing device capturing the digital scene.

10. A system comprising:
    one or more memory devices storing a local-lighting-estimation-neural network; and at least one server device configured to cause the system to:

receive an indication of a designated position within a digital scene;

generate global features for the digital scene utilizing the local-lighting-estimation-neural network;

generate masked global features by masking the global features based on the designated position within the digital scene; and generate location-specific-lighting parameters for the designated position by regressing the masked global features utilizing the local-lighting-estimation-neural network.

11. The system of claim 10, wherein the at least one server device is configured to cause the system to generate concatenated features by concatenating the global features and the masked global features, and wherein regressing the masked global features comprises regressing the concatenated features.

12. The system of claim 10, wherein the at least one server device is configured to cause the system to generate the location-specific-lighting parameters for the designated position by generating location-specific-spherical-harmonic coefficients indicating lighting conditions at the designated position.

13. The system of claim 10, wherein the at least one server device is configured to cause the system to generate a modified digital scene by rendering an object within the digital scene at the designated position illuminated according to the location-specific-lighting parameters for the designated position.

14. The system of claim 13, wherein the at least one server device is configured to cause the system to render the object as an augmented reality object within the digital scene being captured by a camera of the system.

15. A computer-implemented method for estimating lighting conditions for virtual objects, comprising:

receiving an indication of a designated position within a digital scene;

generating a series of feature maps from the digital scene utilizing a neural network;

generating a hyper column of features by extracting values corresponding to the designated position from the feature maps; and generating location-specific-lighting parameters for the designated position by regressing the hyper column of features utilizing the neural network.

16. The computer-implemented method of claim 15, further comprising rendering, within a graphical user interface of a mobile device, a modified digital scene comprising a virtual object at the designated position illuminated according to the location-specific-lighting parameters.

17. The computer-implemented method of claim 16, wherein rendering the modified digital scene comprises rendering an augmented reality scene in real time on a mobile device as a camera of the mobile device captures the digital scene.

18. The computer-implemented method of claim 15, further comprising generating global features for the digital scene from the feature maps.

19. The computer-implemented method of claim 18, further comprising generating concatenated features by concatenating the global features and the hyper column of features, and wherein regressing the hyper column of features comprises regressing the concatenated features.

20. The computer-implemented method of claim 15, wherein generating the location-specific-lighting parameters for the designated position comprises generating location-specific-spherical-harmonic coefficients indicating lighting conditions at the designated position.

* * * * *